(12) United States Patent
Makino et al.

(10) Patent No.: US 9,838,285 B2
(45) Date of Patent: Dec. 5, 2017

(54) CONNECTION MONITORING DEVICE AND CONNECTION MONITORING METHOD

(71) Applicant: FUJITSU LIMITED, Kawasaki-shi, Kanagawa (JP)

(72) Inventors: Tsukasa Makino, Yokohama (JP); Atsushi Igashira, Yokohama (JP); Yosuke Usuda, Kamitakai (JP)

(73) Assignee: FUJITSU LIMITED, Kawasaki (JP)

( * ) Notice: Subject to any disclaimer, the term of this patent is extended or adjusted under 35 U.S.C. 154(b) by 296 days.

(21) Appl. No.: 14/755,397

(22) Filed: Jun. 30, 2015

(65) Prior Publication Data

US 2016/0043920 A1 Feb. 11, 2016

(30) Foreign Application Priority Data

Aug. 6, 2014 (JP) .................................. 2014-160251

(51) Int. Cl.
*G06F 15/173* (2006.01)
*H04L 12/26* (2006.01)
*H04L 12/24* (2006.01)

(52) U.S. Cl.
CPC ...... *H04L 43/0811* (2013.01); *H04L 41/0866* (2013.01)

(58) Field of Classification Search
USPC .................. 709/224, 223, 218, 239, 242
See application file for complete search history.

(56) References Cited

U.S. PATENT DOCUMENTS

2005/0188247 A1 8/2005 Abe et al.

FOREIGN PATENT DOCUMENTS

| JP | 2005-222379 | 8/2005 |
| JP | 2006-146489 | 6/2006 |
| JP | 2007-272702 | 10/2007 |

*Primary Examiner* — Lan-Dai T Truong
(74) *Attorney, Agent, or Firm* — Staas & Halsey LLP

(57) ABSTRACT

A connection monitoring device includes: first and second connection systems in which monitored devices are connected in cascade in forward and backward directions, respectively; a storage unit to store configuration information on connection configuration of the monitored devices and connection permitting information including information on a path permitted between the connection monitoring device and the monitored devices within paths undefined in the configuration information; and a control unit to change from a first monitoring state in which the connection configuration of the monitored devices is monitored in accordance with the configuration information to a second monitoring state in which the connection configuration of the monitored devices is monitored in accordance with the configuration information and the connection permitting information in a case where a configuration modification, accompanied with cutting of any one of connections of the first and second connection systems, of the monitored devices is performed.

10 Claims, 35 Drawing Sheets

| DETECTION SEQUENCE | 0-SYSTEM PORT E00 IDENTIFICATION INFORMATION | 1-SYSTEM PORT E10 IDENTIFICATION INFORMATION |
|---|---|---|
| 1 | DE00 IOM00 | DE03 IOM31 |
| 2 | DE01 IOM10 | DE02 IOM21 |
| 3 | DE02 IOM20 | DE01 IOM11 |
| 4 | DE03 IOM30 | DE00 IOM01 |

| DE IDENTIFICATION INFORMATION | 0-SYSTEM IOM IDENTIFICATION INFORMATION | 1-SYSTEM IOM IDENTIFICATION INFORMATION |
|---|---|---|
| DE00 | IOM00 | IOM01 |
| DE01 | IOM10 | IOM11 |
| DE02 | IOM20 | IOM21 |
| DE03 | IOM30 | IOM31 |

| DETECTION SEQUENCE | 0-SYSTEM PORT E00 IDENTIFICATION INFORMATION | 1-SYSTEM PORT E10 IDENTIFICATION INFORMATION | 1-SYSTEM PORT E11 IDENTIFICATION INFORMATION |
|---|---|---|---|
| 1 | DE00 IOM00 | DE03 IOM31 | - |
| 2 | DE01 IOM10 | DE02 IOM21 | - |
| 3 | DE02 IOM20 | DE01 IOM11 | - |
| 4 | DE03 IOM30 | DE00 IOM01 | - |
| 5 | DE04 IOM40 | - | - |

| DE IDENTIFICATION INFORMATION | 0-SYSTEM IOM IDENTIFICATION INFORMATION | 1-SYSTEM IOM IDENTIFICATION INFORMATION |
|---|---|---|
| DE00 | IOM00 | IOM01 |
| DE01 | IOM10 | IOM11 |
| DE02 | IOM20 | IOM21 |
| DE03 | IOM30 | IOM31 |
| DE04 | IOM40 | - |

| DETECTION SEQUENCE | 0-SYSTEM PORT E00 IDENTIFICATION INFORMATION | 1-SYSTEM PORT E10 IDENTIFICATION INFORMATION | 1-SYSTEM PORT E11 IDENTIFICATION INFORMATION |
|---|---|---|---|
| 1 | DE00 IOM00 | - | - |
| 2 | DE01 IOM10 | - | - |
| 3 | DE02 IOM20 | - | - |
| 4 | DE03 IOM30 | - | - |
| 5 | DE04 IOM40 | - | - |

| DE IDENTIFICATION INFORMATION | 0-SYSTEM IOM IDENTIFICATION INFORMATION | 1-SYSTEM IOM IDENTIFICATION INFORMATION |
|---|---|---|
| DE00 | IOM00 | IOM01 |
| DE01 | IOM10 | IOM11 |
| DE02 | IOM20 | IOM21 |
| DE03 | IOM30 | IOM31 |
| DE04 | IOM40 | - |

| DETECTION SEQUENCE | 0-SYSTEM PORT E00 IDENTIFICATION INFORMATION | 1-SYSTEM PORT E10 IDENTIFICATION INFORMATION | 1-SYSTEM PORT E11 IDENTIFICATION INFORMATION |
|---|---|---|---|
| 1 | DE00 IOM00 | - | DE03 IOM31 |
| 2 | DE01 IOM10 | - | DE02 IOM21 |
| 3 | DE02 IOM20 | - | DE01 IOM11 |
| 4 | DE03 IOM30 | - | DE00 IOM01 |
| 5 | DE04 IOM40 | - | - |

| DE IDENTIFICATION INFORMATION | 0-SYSTEM IOM IDENTIFICATION INFORMATION | 1-SYSTEM IOM IDENTIFICATION INFORMATION |
|---|---|---|
| DE00 | IOM00 | IOM01 |
| DE01 | IOM10 | IOM11 |
| DE02 | IOM20 | IOM21 |
| DE03 | IOM30 | IOM31 |
| DE04 | IOM40 | - |

| DETECTION SEQUENCE | 0-SYSTEM PORT E00 IDENTIFICATION INFORMATION | 1-SYSTEM PORT E10 IDENTIFICATION INFORMATION | 1-SYSTEM PORT E11 IDENTIFICATION INFORMATION |
|---|---|---|---|
| 1 | DE00 IOM00 | DE04 IOM41 | DE03 IOM31 |
| 2 | DE01 IOM10 | - | DE02 IOM21 |
| 3 | DE02 IOM20 | - | DE01 IOM11 |
| 4 | DE03 IOM30 | - | DE00 IOM01 |
| 5 | DE04 IOM40 | - | - |

| DE IDENTIFICATION INFORMATION | 0-SYSTEM IOM IDENTIFICATION INFORMATION | 1-SYSTEM IOM IDENTIFICATION INFORMATION |
|---|---|---|
| DE00 | IOM00 | IOM01 |
| DE01 | IOM10 | IOM11 |
| DE02 | IOM20 | IOM21 |
| DE03 | IOM30 | IOM31 |
| DE04 | IOM40 | IOM41 |

| DETECTION SEQUENCE | 0-SYSTEM PORT E00 IDENTIFICATION INFORMATION | 1-SYSTEM PORT E10 IDENTIFICATION INFORMATION | 1-SYSTEM PORT E11 IDENTIFICATION INFORMATION |
|---|---|---|---|
| 1 | DE00 IOM00 | DE04 IOM41 | - |
| 2 | DE01 IOM10 | DE03 IOM31 | - |
| 3 | DE02 IOM20 | DE02 IOM21 | - |
| 4 | DE03 IOM30 | DE01 IOM11 | - |
| 5 | DE04 IOM40 | DE00 IOM01 | - |

| DE IDENTIFICATION INFORMATION | 0-SYSTEM IOM IDENTIFICATION INFORMATION | 1-SYSTEM IOM IDENTIFICATION INFORMATION |
|---|---|---|
| DE00 | IOM00 | IOM01 |
| DE01 | IOM10 | IOM11 |
| DE02 | IOM20 | IOM21 |
| DE03 | IOM30 | IOM31 |
| DE04 | IOM40 | IOM41 |

CONNECTION MONITORING DEVICE AND CONNECTION MONITORING METHOD

CROSS-REFERENCE TO RELATED APPLICATION

This application is based upon and claims the benefit of priority from the prior Japanese Patent Application No. 2014-160251 filed on Aug. 6, 2014, the entire contents of which are incorporated herein by reference.

FIELD

The embodiments discussed herein are related to a connection monitoring device, and a connection monitoring method.

BACKGROUND

As an amount of data accompanied by an information processing is increased in recent years, the size of a storage device where the data are written is being increased as well. Further, the storage device includes two or more redundant connection routes in preparation for an occurrence of a fault and switches the connection route when the fault is detected. For example, the storage device is equipped with a redundancy for the fault occurrence by being provided with a forward connection route in which equipment are connected in cascade in a forward direction and a backward connection route in which equipment are connected in cascade in a backward direction which is opposite to the forward direction.

As described above, in a storage device, the number of constitutional equipment such as a controller module or a disk enclosure is increasing and a connection route which connects the constitutional equipment is becoming complicated. In the storage device, a controller module is utilized as, for example, a connection monitoring device which monitors a connection of a monitored device such as, for example, a disk enclosure and detects an erroneous connection of the monitored device in coping with the increase in the number of constitutional equipment or complication of the connection route.

Related technologies are disclosed in, for example, Japanese Laid-Open Patent Publication No. 2006-146489, Japanese Laid-Open Patent Publication No. 2005-222379, and Japanese Laid-Open Patent Publication No. 2007-272702.

SUMMARY

According to an aspect of the invention, a connection monitoring device includes: a first connection system in which a plurality of monitored devices are connected in cascade in a forward direction on which data is transmitted from the connection monitoring device to a first monitored device of the monitored devices; a second connection system in which the monitored devices are connected in cascade in a backward direction on which data is transmitted from the connection monitoring device to a last monitored device of the monitored devices; a storage unit configured to store configuration information on connection configuration of the monitored devices and connection permitting information including information on a path permitted between the connection monitoring device and the monitored devices within paths undefined in the configuration information; and a control unit configured to change a monitoring state from a first monitoring state in which the connection configuration of the monitored devices is monitored in accordance with the configuration information to a second monitoring state in which the connection configuration of the monitored devices is monitored in accordance with the configuration information and the connection permitting information in a case where a configuration modification, accompanied with cutting of any one of connections of the first connection system and the second connection system, of the monitored devices is performed.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of IOM configuration information according to the second embodiment;

FIG. 7 is a diagram illustrating an example of DE configuration information according to the second embodiment;

FIG. 12 is a diagram illustrating an example of IOM list information according to the second embodiment;

FIG. 13 is a diagram illustrating an example of DE list information according to the second embodiment;

FIG. 15 is a diagram illustrating another example of the IOM list information according to the second embodiment;

FIG. 16 is a diagram illustrating another example of the DE list information according to the second embodiment;

FIG. 18 is a diagram illustrating still another example of the IOM list information according to the second embodiment;

FIG. 19 is a diagram illustrating still another example of the DE list information according to the second embodiment;

FIG. 21 is a diagram illustrating still yet another example of the IOM list information according to the second embodiment;

FIG. 22 is a diagram illustrating still yet another example of the DE list information according to the second embodiment;

FIG. 24 is a diagram illustrating still yet another example of the IOM list information according to the second embodiment;

FIG. 25 is a diagram illustrating still yet another example of the DE list information according to the second embodiment;

DESCRIPTION OF EMBODIMENTS

In a storage device where the number of constitutional equipment such as a controller module or a disk enclosure is increasing, a connection route connecting the constitutional equipment is becoming complicated. The controller module is utilized as, for example, a connection monitoring device which monitors the connection of a monitored device such as, for example, the disk enclosure and detects an erroneous connection of the monitored device. As a result, a time required for a configuration modification work such as an addition of a constitutional equipment tends to increase.

For example, when an addition of an equipment which constitutes a storage device is performed, the storage device may lose some of its redundancies due to the recombination in the connection of the equipment. The loss of redundancy may be limited to a short time period, but the increase of the time period required for configuration modification work makes it difficult to limit the loss of redundancy to the short time period.

Hereinafter, descriptions will be made on an embodiment of a technology of securing a working hour by limiting the time period during which the redundancy is lost when the configuration of the monitored device is modified, with reference to accompanying drawings.

First Embodiment

Figure 1:
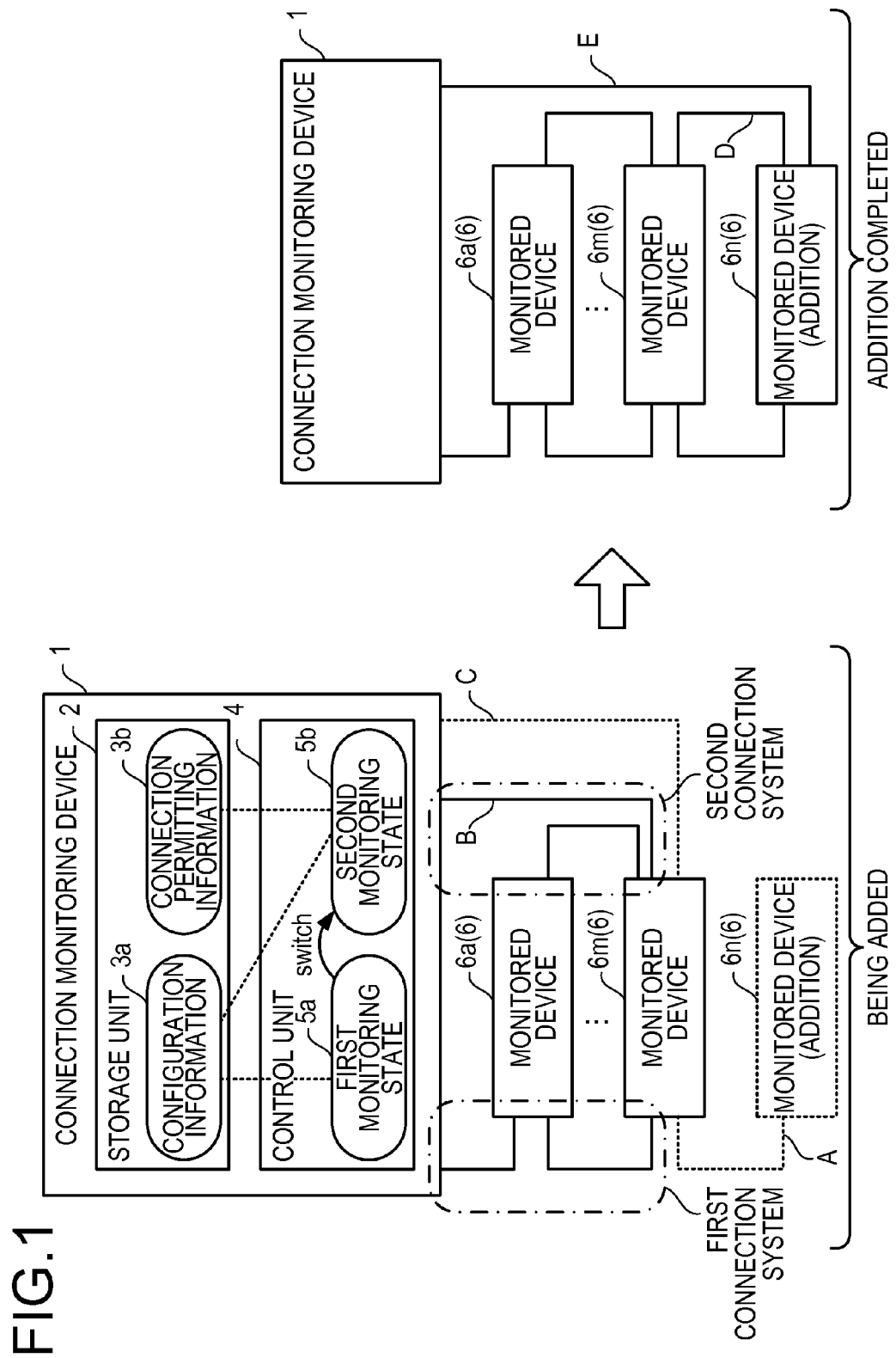
FIG. 1 is a diagram illustrating an exemplary configuration of a connection monitoring device according to a first embodiment.

Descriptions will be made on a connection monitoring device of a first embodiment with reference to FIG. 1. FIG. 1 is a diagram illustrating an exemplary configuration of a connection monitoring device according to a first embodiment. The connection monitoring device 1 monitors a connection state of a plurality of monitored devices 6 ($6a$, . . . , $6n$). The plurality of monitored device 6s ($6a$, . . . , $6n$) are connected by a redundancy relation in a first connection system and a second connection system. The connection monitoring device 1 is one of an information processing device and includes, for example, a controller module of a RAID (Redundant Arrays of Independent Disks) device.

The monitored device 6 is connected with the connection monitoring device 1 and is a target to be detected by the connection monitoring device 1. The monitored device 6 is, for example, a disk enclosure constituting the RAID device. In the first connection system, a plurality of monitored devices 6 is connected in cascade in a forward direction. In the second connection system, a plurality of monitored devices 6 is connected in cascade in a backward direction. For example, in the first connection system, the plurality of monitored devices 6 are connected in cascade in a predetermined sequence (a sequence in a sequential flow starting from the monitored device $6a$ to the monitored device $6n$ which serves as a terminating device) which starts from the connection monitoring device 1 as a starting point. For example, in the second connection system, the plurality of monitored devices 6 are connected in cascade in a predetermined sequence (a sequence in a sequential flow starting from the monitored device $6n$ to the monitored device $6a$ which serves as a terminating device) which starts from the connection monitoring device 1 as a starting point.

The connection monitoring device 1 includes a storage unit 2 and a control unit 4. The storage unit 2 stores configuration information $3a$ and connection permitting information $3b$. The storage unit 2 is a device capable of storing information and includes, for example, a HDD (Hard Disk Drive) or various memories. The configuration information $3a$ is information about a connection configuration of the monitored device 6. The configuration information $3a$ is, for example, information about an access path between the connection monitoring device 1 and the plurality of monitored device 6 ($6a$, . . . , $6n$).

The connection permitting information $3b$ is information which permits a connection which is not defined in the configuration information $3a$. The connection permitting information $3b$ includes information about the access path permitted between the connection monitoring device 1 and the plurality of monitored devices 6 ($6a$, . . . , $6n$) among the access paths that are not defined in, for example, the configuration information $3a$. The access path defined in the connection permitting information $3b$ maintains multiple access paths (redundancy) during a work for an addition.

A control unit 4 disconnects any one of connections made in the first connection system and the second connection system. When the configuration modification for the monitored device 6 is performed, the control unit 4 switches from a first monitoring state 5a to a second monitoring state 5b. The configuration modification for the monitored device 6 includes an addition, a replacement, and a separation of the monitored device 6. The first monitoring state 5a is a state where the control unit 4 monitors a connection configuration of the monitored device 6 according to the configuration information 3a. In the second monitoring state 5b, the control unit 4 monitors the connection configuration of the monitored device 6 according to the configuration information 3a and the connection permitting information 3b.

Accordingly, the connection monitoring device 1 may permit the connection which is not defined in the configuration information 3a in a state where any one of connections made in the first connection system and the second connection system is disconnected when the configuration modification of the monitored device 6 is being performed. Therefore, the connection monitoring device 1 may secure a working hour by limiting a lost time period of redundancy during the configuration modification of the monitored device 6.

Here, descriptions will be made on an a case where the monitored device 6n is added to the plurality of monitored devices 6 (6a, . . . , 6m). First, the connection monitoring device 1 monitors the monitored device 6 in the first monitoring state 5a. The connection monitoring device 1 permits a link "A" by which the monitored device 6n intended to add is connected to the monitored device 6m based on the configuration information 3a. Accordingly, the monitored device 6n is connected with the connection monitoring device 1 by the link "A" and the first connection system, and connected with the terminating device in cascade in the forward direction. Further, the link may be a connection route through a physical wiring such as a cable and otherwise, a connection route through a wireless communication.

In the backward cascade connection, the monitored device 6a serves as a terminating device, and the monitored device 6n tries to be connected between the monitored device 6m and the connection monitoring device 1. Therefore, the monitored device 6m is disconnected from a link "B" connecting the monitored device 6m and the connection monitoring device 1. In this connection state, the connection monitoring device 1 loses the redundancy in a connection with the monitored device 6.

The connection monitoring device 1 switches its connection from the first monitoring state 5a to the second monitoring state 5b such that a link "C" which is not permitted by the configuration information 3a is permitted by the connection permitting information 3b. Accordingly, the connection monitoring device 1 may recover the redundancy to secure the working hours. Further, the link "B" and link "C" may be distinguished from each other by a port of a connection destination.

Thereafter, the monitored device 6m and the monitored device 6n are connected by a link "D" and the monitored device 6n and the connection monitoring device 1 are connected by a link "E" such that the monitored device 6 is connected in cascade in a backward direction. The connection work is complex and requires time, but the redundancy in the connection during the work is maintained by the link "C". The monitored device 6 may be disconnected from the link "C" accompanied by being connected with the links "D" and "E" so as to complete the addition work in a connection state permitted by the configuration information 3a.

Second Embodiment

Figure 2:
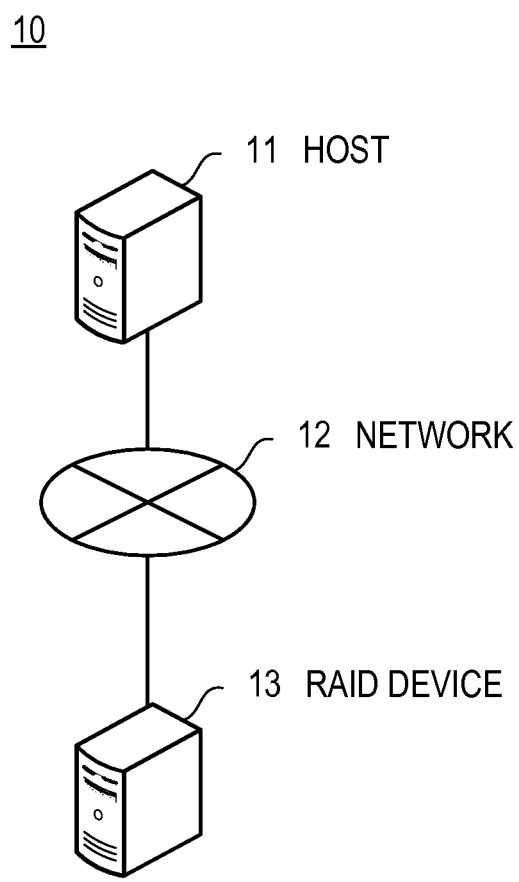
FIG. 2 is a diagram illustrating an exemplary storage system according to a second embodiment.

Next, a storage system of the second embodiment will be described with reference to FIG. 2. FIG. 2 is a diagram illustrating an exemplary configuration of a storage system of a second embodiment.

A storage system 10 includes a host 11 and an RAID device 13 connected to the host 1 through a network 12. The storage system 10 writes data into the RAID device 13 or reads data from the RAID device 13 according to an I/O request (input/output request) by the host 11. Further, the storage system 10 may include a plurality of hosts 11 and a plurality of RAID devices 13.

Figure 3:
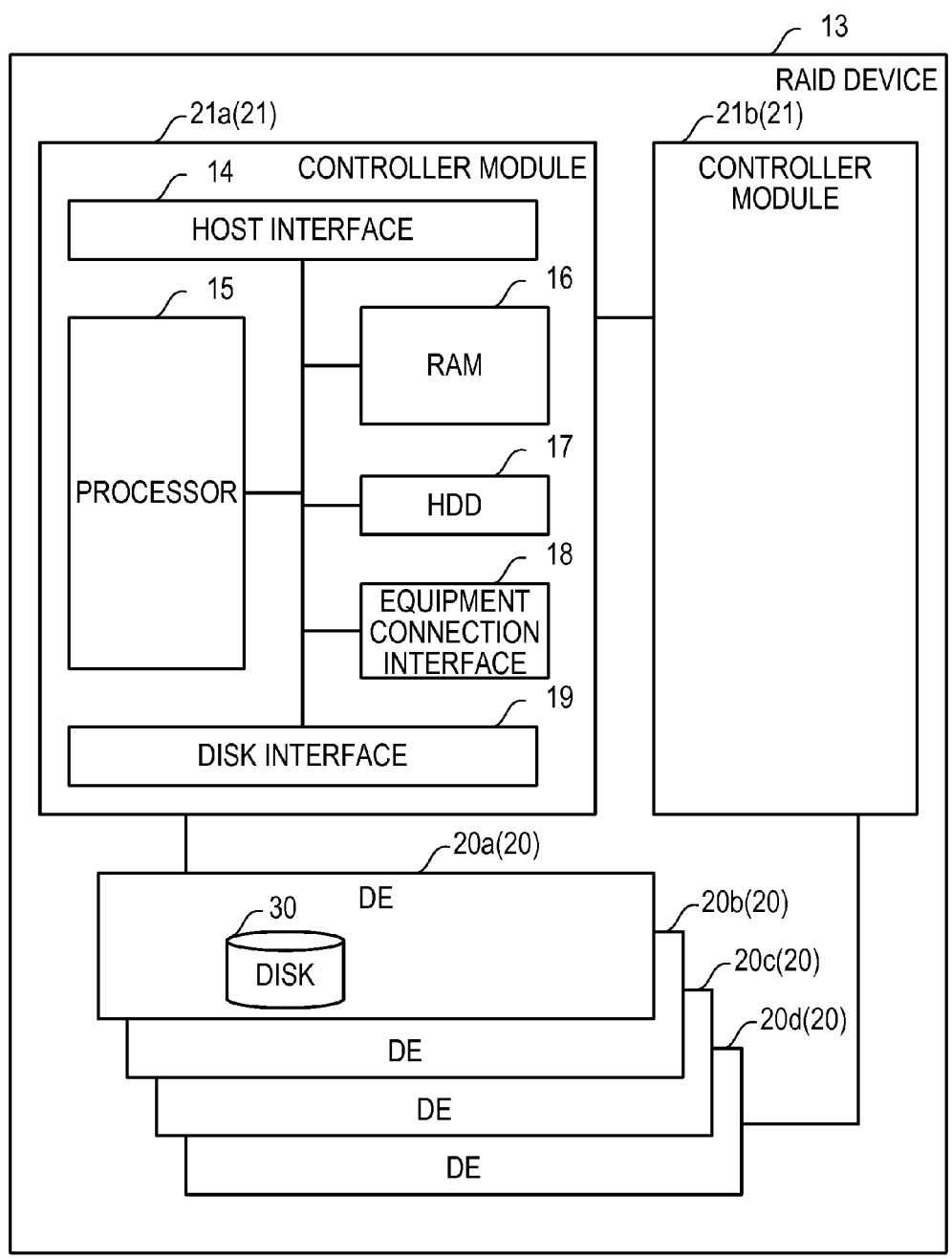
FIG. 3 is a diagram illustrating an exemplary RAID device according to the second embodiment.

Next, the hardware configuration of the RAID device 13 of the second embodiment will be described with reference to FIG. 3. FIG. 3 is a diagram illustrating an example of a hardware configuration of an RAID device of the second embodiment. The RAID device 13 includes a controller module 21 (21a and 21b) and a disk enclosure (DE) 20 (20a, 20b, 20c, and 20d). The DE 20 is connected in one system where the DE 20 is connected with the controller module 21a in cascade in a forward direction and other one system where the DE 20 is connected with the controller module 21b in cascade in a backward direction. Further, when a single controller module 21 exists, the DE 20 may be connected with the single controller module 21b in two systems. Details of the connection configuration between the controller module 21 and the DE 20 will be described later with reference to FIG. 4.

The controller module 21 includes a host interface 14, a processor 15, an RAM (Random Access Memory) 16, a HDD 17, an equipment connection interface 18, and a disk interface 19.

The controller module 21 is controlled by the processor 15 in its entirety. The RAM 16 and a plurality of peripheral equipment are connected to the processor 15 through a bus. The processor 15 may be a multi-core processor composed of two or more processors. Further, a master/slave relationship is established between the controller modules 21a and 21b, and the processor 15 of the controller module 21 which serves as a master may control the controller module 21 and the entirety of the RAID device 13.

The processor 15 is, for example, a CPU, an MPU (Micro Process Unit), a DSP (Digital Signal Processor), an ASIC (Application Specific Integrated Circuit), or a PLD (Programmable Logic Device).

The RAM 16 is used as a primary storage device of the controller module 21. In the RAM 16, at least a portion of an OS (Operating System) program or an application program executed by the processor 15 is temporarily stored. Further, various data needed for a process to be executed by the processor 15 are stored in the RAM 16. Further, the RAM 16 functions as a cache memory of the processor 15.

The peripheral equipment connected to the bus may include the host interface 14, the HDD 17, the equipment connection interface 18, and the disk interface 19. The host interface 14 transmits and receives data to and from the host 11 through the network 12.

The HDD 17 performs writing and reading data into and from a built-in disk magnetically. The HDD 17 is used as an auxiliary storage device of the RAID device 13. The OS program, the application program, and various data are stored in the HDD 17. In the meantime, a semiconductor storage device such as a flash memory may be used as the auxiliary storage device.

The equipment connection interface 18 is a communication interface for connecting the peripheral equipment to the controller module 21. For example, a memory device or a memory reader/writer which is not illustrated may be connected to the equipment connection interface 18. The memory device is a recording medium equipped with a function for communicating with the equipment connection interface 18. The memory reader/writer is a device which performs writing data into the memory card or reading data from the memory card. The memory card is, for example, a card type recording medium.

Further, the equipment connection interface 18 may be connected with a monitor not illustrated. In this case, the equipment connection interface 18 has a function that displays information on a display unit according to an instruction from the processor 15.

Further, the equipment connection interface 18 may be connected with a keyboard or a mouse which is not illustrated. In this case, the equipment connection interface 18 transmits signal sent from the keyboard or the mouse to the processor 15. Further, the mouse is an example of a pointing device, and other pointing device may be used. The other pointing device may include, for example, a touch panel, a tablet, a touch pad, and a track ball.

Further, the equipment connection interface 18 may be connected with an optical drive device which is not illustrated. The optical drive device reads data written into an optical disk by using, for example, laser light. The optical disk is a portable recording medium in which data is written to be capable of being read by reflection of light. The optical disk may include, for example, a DVD (Digital Versatile Disc), a DVD-RAM, a CD-ROM (Compact Disc Read Only Memory), or a CD-R (Recordable)/RW (ReWritable).

The disk interface 19 transmits and receives data to and from a single DE or two or more DEs 20. The DE 20 is connected with the controller module 21 through the disk interface 19. The DE 20 includes one or more disks 30 and stores data based on the instruction from the controller module 21. The disk is a storage device and includes, for example, a HDD or SSD (Solid State Drive).

With the hardware configuration described above, the processing function of the RAID device 13 may be implemented. The RAID device 13 executes a program recorded in, for example, the computer-readable recording medium to implement the processing function of the RAID device 13. The program in which process contents to be executed by the RAID device 13 are described may be recorded into various recording media. For example, the program to be executed by the RAID device 13 may be stored in the HDD 17. The processor 15 loads at least a portion of the program stored in the HDD 17 onto the RAM 16 and executes the program. Further, the program to be executed by the RAID device 13 may be recorded in the portable recording medium such as the optical disk, the memory device, or the memory card. The program stored in the portable recording medium becomes executable after being installed on the HDD 17 by the control from the processor 15. Further, the processor 15 may directly read a program from the portable recording medium to execute the program.

Figure 4:
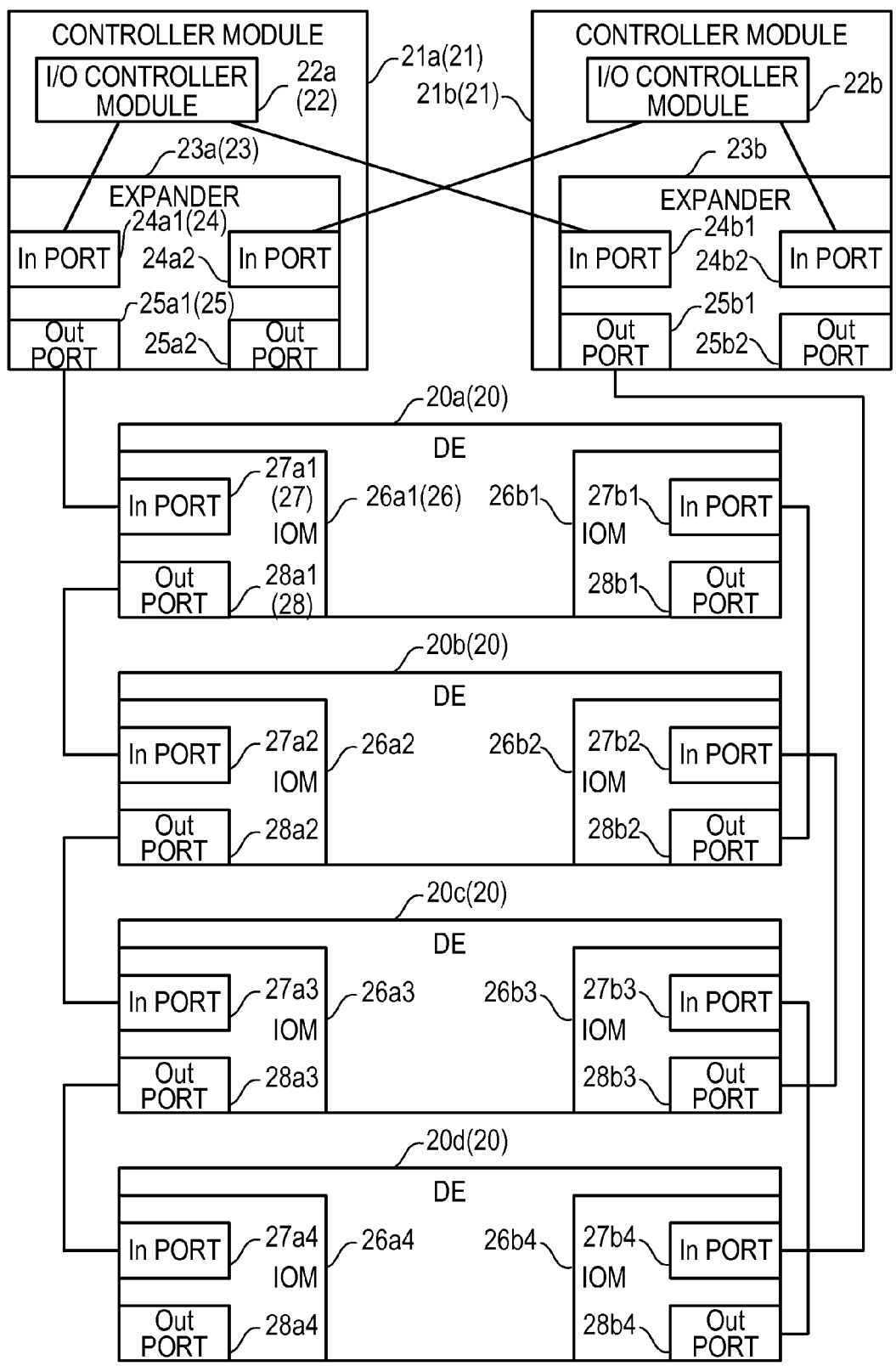
FIG. 4 is a diagram illustrating an example of a connection configuration between a controller module and a DE according to the second embodiment.

Next, descriptions will be made on a connection configuration between the controller module 21 and the DE with reference to FIG. 4. FIG. 4 is a diagram illustrating an example of a connection configuration between a controller module and a DE according to the second embodiment.

The controller module 21 (21a and 21b) is connected with the DE 20 (20a, 20b, 20c, and 20d) in two systems. In two systems for connection, one system (0-system) connects the controller module 21a with the DE 20, and other one system (1-system) connects the controller module 21b and the DE 20.

The controller module 21 includes an I/O controller 22 and an expander 23 in the disk interface 19. The I/O controller 22 controls an I/O between the controller module 21 and the DE 20. The expander 23 includes a plurality of In ports 24 and a plurality of Out ports 25 and extends connectivity between the I/O controller 22 and the DE 20. The In port 24 is a port to be connected with the I/O controller 22 and the Out port 25 24 is a port to be connected with the DE 20.

For example, the controller module 21a and the controller module 21b include the I/O controller 22a and I/O controller 22b, respectively, and include the expander 23a and expander 23b, respectively. The expander 23a includes In ports 24a1 and 24a2 and Out ports 25a1 and 25a2, and the expander 23b includes In ports 24b1 and 24b2 and Out ports 25b1 and 25b2.

For example, the controller module 21a is connected with the I/O controller 22a at the In port 24a1, and the controller module 21b is connected with the I/O controller 22b at the In port 24b2.

Further, the controller module 21a and the controller module 21b are connected with each other through the expander 23. For example, the controller module 21a is connected with the I/O controller 22b at the In port 24a2, and the controller module 21b is connected with the I/O controller 22a at the In port 24b1.

The DE 20 includes an IOM (I/O Module) 26. For example, the DE 20a includes IOMs 26a1 and 26b1. Similarly, the DE 20b includes IOMs 26a2 and 26b2, the DE 20c includes IOMs 26a3 and 26b3, and the DE 20d includes IOMs 26a4 and 26b4.

The IOM 26 performs a data input/output for the DE 20. The IOM 26 includes an In port 27 and an Out port 28 that perform the data input/output. The In port 27 is a port to be connected in a direction toward the controller module 21 from the DE 20, and the Out port 28 is a port to be connected in a connection terminating direction toward from the DE 20.

For example, the IOM 26a1 and the IOM 26b1 include an In port 27a1 and an In port 27b1, respectively, and include an Out port 28a1 and an Out port 28b1, respectively. Similarly, the IOM 26a2 and the IOM 26b2 include an In port 27a2 and an In port 27b2, respectively, and include an Out port 28a2 and an Out port 28b2, respectively. Similarly, the IOM 26a3 and the IOM 26b3 include an In port 27a3 and an In port 27b3, respectively, and include an Out port 28a3 and an Out port 28b3, respectively. Similarly, the IOM 26a4 and the IOM 26b4 include an In port 27a4 and an In port 27b4, respectively, and include an Out port 28a4 and an Out port 28b4, respectively.

In the connection configuration of the 0-system, the DE 20b, the DE 20c, and the DE 20d are connected in cascade from the DE 20a in a sequence which starts from the controller module 21a as a starting point. For example, the Out port 25a1 of the controller module 21a is connected with the In port 27a1 of the DE 20a. The Out port 28a1 of the DE 20a is connected with the In port 27a2 of the DE 20b. The Out port 28a2 of the DE 20b is connected with the In port 27a3 of the DE 20c. The Out port 28a3 of the DE 20c is connected with the In port 27a4 of the DE 20d, and the DE 20d terminates the connection of the 0-system.

In the connection configuration of the 1-system, the DE 20c, the DE 20b, and the DE 20a are connected in cascade from the DE 20d in a sequence which starts from the controller module 21*b* as a starting point. For example, the Out port 25*b*1 of the controller module 21*b* is connected with the In port 27*b*4 of the DE 20*d*. The Out port 28*b*4 of the DE 20*d* is connected with the In port 27*a*3 of the DE 20*c*. The Out port 28*b*3 of the DE 20*c* is connected with the In port 27*b*2 of the DE 20*b*. The Out port 28*b*2 of the DE 20*d* is connected with the In port 27*b*1 of the DE 20*a* and the DE 20*a* terminates the connection of the 1-system.

Further, when it is assumed that the connection sequence in the 0-system is a normal sequence, the DE 20 to be connected to the controller module 21 is connected in a connection sequence, which is opposite to the connection sequence in the 0-system, in the 1-system. Further, when a single controller module 21 exists, the single controller module 21 is connected with the DE 20 in two systems. Two ports (In port 27 and Out ports 25 and 28) are connected with each other through a link and connecting the two ports needs a connection work by a worker. Further, the link may be a connection route through a physical wiring such as a cable and otherwise, a connection route through a wireless communication.

The RAID device 13 may be connected to the DE 20 by the controller module 21 (21*a* and 21*b*) in two systems such that multiple accessing (redundancy) to DE 20 may be achieved. Accordingly, when any one of two controller modules 21*a* and 21*b* is in failure, other one of two controller modules 21*a* and 21*b* may continue accessing to the DE 20 in the RAID device 13.

In the RAID device 13, the controller module 21 and the DE 20 are accommodated in a predetermined case and disposed in a rack in a predetermined sequence (e.g., an order according to identification information). In general, in the 0-system, the DE 20 is connected in a disposition sequence from the controller module 21 and in the 1-system, the DE 20 is connected in a sequence, which is opposite to the sequence in the 0-system, from the controller module 21. Therefore, in the connection in the 1-system, a distance from the controller module 21 to the DE 20 of the terminating device is longer, a wiring is more complicate, and a load applied on the connection work is larger than those of the 0-system.

Figure 5:
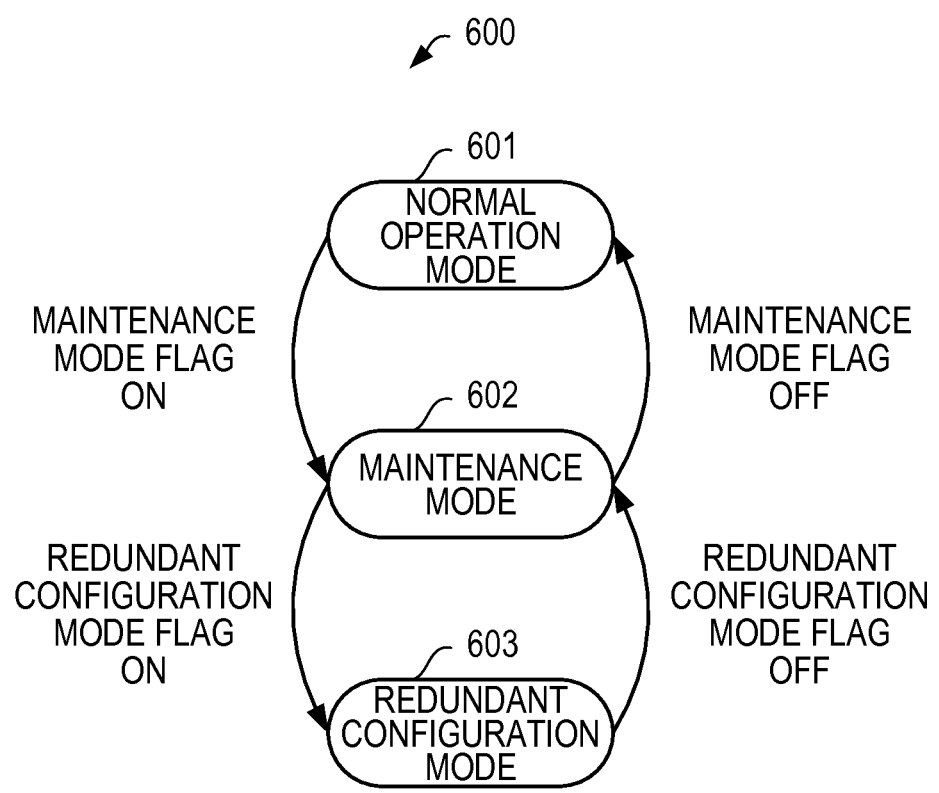
FIG. 5 is a diagram illustrating an example of an operation state transition diagram according to the second embodiment.

Next, descriptions will be made on an operation state of the RAID device 13 with reference to FIG. 5. FIG. 5 is a diagram illustrating an example of an operation state transition diagram according to the second embodiment. An operation state transition diagram 600 illustrates an operation state and a state transition condition of the RAID device 13. The operation state of the RAID device 13 includes a normal operation mode 601, a maintenance mode 602, and a redundant configuration mode 603.

The normal operation mode 601 is an operation state which becomes a normal state and in which, for example, the controller module 21 is connected with the DE 20 in two systems composed of the 0-system and the 1-system. The maintenance mode 602 is an operation state which becomes a maintenance state and in which, for example, the controller module 21 is monitoring an addition work. The redundant configuration mode 603 is an operation state in which a connection configuration not permitted in the maintenance state is permitted and for example, a redundant configuration not provided in the normal state is provided.

The normal operation mode 601 transits to the maintenance mode 602 when a maintenance mode flag becomes ON. Further, the maintenance mode 602 transits to the normal operation mode 601 when the maintenance mode flag becomes OFF. The maintenance mode 602 transits to the redundant configuration mode 603 when a redundant configuration mode flag becomes ON. Further, the redundant configuration mode 603 transits to the maintenance mode 602 when the redundant configuration mode flag becomes OFF.

Figure 8:
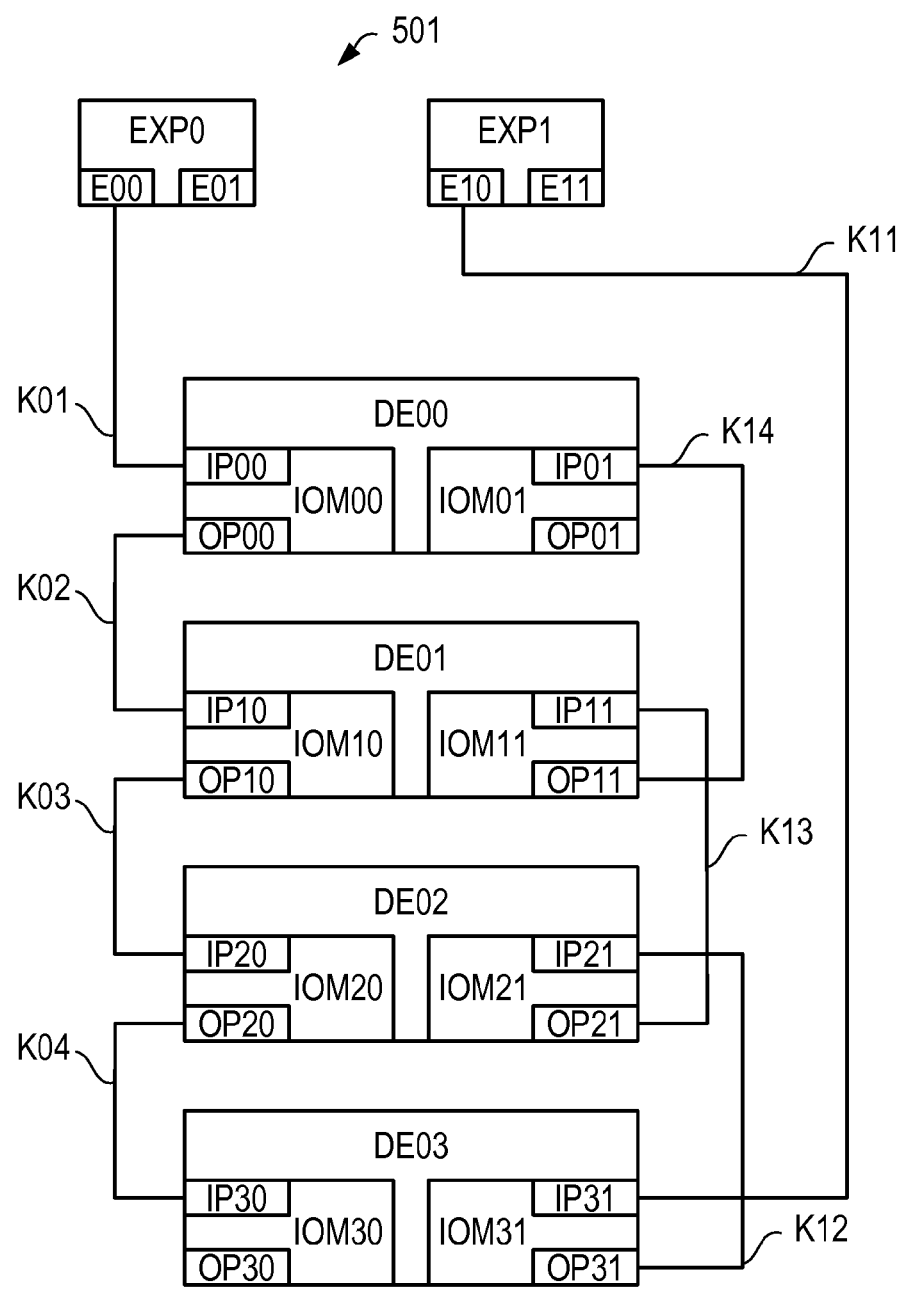
FIG. 8 is a diagram illustrating an example of a connection configuration of the RAID device which is in a normal state according to the second embodiment.

Descriptions will be made on the connection configuration of the RAID device 13 which is in the normal state with reference to FIG. 6 to FIG. 8. First, descriptions will be made on IOM configuration information 211 with reference to FIG. 6. FIG. 6 is a diagram illustrating an example of IOM configuration information according to the second embodiment.

The IOM configuration information 211 is information capable of specifying an equipment configuration for each connection system. The IOM configuration information 211 is previously stored in the RAID device in the normal operation mode 601 and is used for confirming the equipment configuration for each connection system. The IOM configuration information 211 is information previously set by, for example, a maintenance worker and is stored in, for example, the HDD 17. The IOM configuration information 211 includes identification information of an equipment to be detected for each connection system and information capable of specifying a detection sequence. The identification information of the equipment to be detected for each connection system is, for example, a 0-system port E00 identification information or 1-system port E10 identification information. Further, the information capable of specifying the detection sequence is, for example, a detection sequence (1, 2, . . . ). The identification information of the equipment is information capable of uniquely specifying an equipment or a port of equipment, and may include, for example, WWPN (World Wide Port Name).

In a field for the 0-system port E00 identification information, the identification information of respective equipment is arranged in an order of equipment capable of being detected from the port E00 of the expander 23 of the 0-system. Further, in a field for the 1-system port E10 identification information, the identification information of respective equipment are arranged in an order of equipment capable of being detected from the port E10 of the expander 23 in the 1-system. Further, each of the ports E00 and E10 of the expander 23 indicated in the IOM configuration information 211 is the Out port 25 used in the normal operation mode 601 by the RAID device 13.

Next, descriptions will be made on DE configuration information 221 with reference to FIG. 7. FIG. 7 is a diagram illustrating an example of DE configuration information according to the second embodiment. The DE configuration information 221 is information capable of specifying the IOM 26 of each DE 20 for each connection system. The DE configuration information 221 is information capable of being configured from the IOM configuration information 211 and is generated by, for example, the RAID device 13 after the IOM configuration information 211 is set. The DE configuration information 221 includes identification information of the DE 20, identification information of the IOM 26 of the 0-system, and identification information of the IOM 26 of the 1-system. The DE configuration information 221 is used in determination of whether the IOM 26 of the 0-system is normally connected with the IOM 26 of the 1-system for the DE 20 in the normal operation mode 601.

Next, descriptions will be made on the connection configuration of the RAID device 13 which is in the normal state. FIG. 8 is a diagram illustrating an example of a connection configuration of the RAID device which is in a normal state according to the second embodiment. The connection configuration 501 is a connection configuration of the RAID device 13 which is in the normal state and is configured based on the IOM configuration information 211. The connection configuration 501 is the same connection configuration as that of FIG. 4, but the expander 23, the DE 20, the IOM 26, the Out port 25, the In port 27, and the Out port 28 are denoted using identification information instead of reference symbols in order to simplify the description.

One of two expanders 23 is denoted by the identification information EXP0 and other one is denoted by the identification information EXP1. Four DEs 20 are denoted by identification information DE00, identification information DE01, identification information DE02, and identification information DE03, respectively. One of two IOMs 26 of the DE00 is denoted by identification information IOM00 and other one is denoted by identification information IOM01. Other IOMs 26 provided in other DE 20 is similarly denoted by identification information. Among ports provided in an IOM00, the In port is denoted by the identification information IP00 and the Out port is denoted by the identification information OP00. Other ports provided in other IOM 26 are denoted by identification information similarly to two ports provided in the IOM00, and denoting by identification information as described above is similarly applied to FIG. 9 to FIG. 11, FIG. 14, FIG. 17, FIG. 20, and FIG. 23.

In the connection configuration 501, the connection between the expanders (EXP0 and EXP1) and the DE (DE00, DE01, DE02, DE03) is indicated using links K01, K02, K03, K04, K11, K12, K13, and K14. The links K01, K02, K03, and K04 belong to the 0-system. The links that belong to the 0-system connect the DE (DE00, DE01, DE02, and DE03) in cascade manner from the port E00 of the expander EXP0 in a predetermined sequence. For example, the predetermined sequence is a sequence in which the identification information DE00, DE01, DE02, and DE03 of the DE 20 are listed in an ascending order. The links K11, K12, K13, and K14 belong to the 1-system. The links that belong to the 1-system connect the DE (DE00, DE01, DE02, and DE03) in cascade manner from the port E10 of the expander EXP10 in a sequence, which is opposite to that in the 0-system. For example, the predetermined sequence is a sequence in which the identification information DE03, DE02, DE01, and DE00 of the DE 20 are listed in a descending order.

Figure 9:
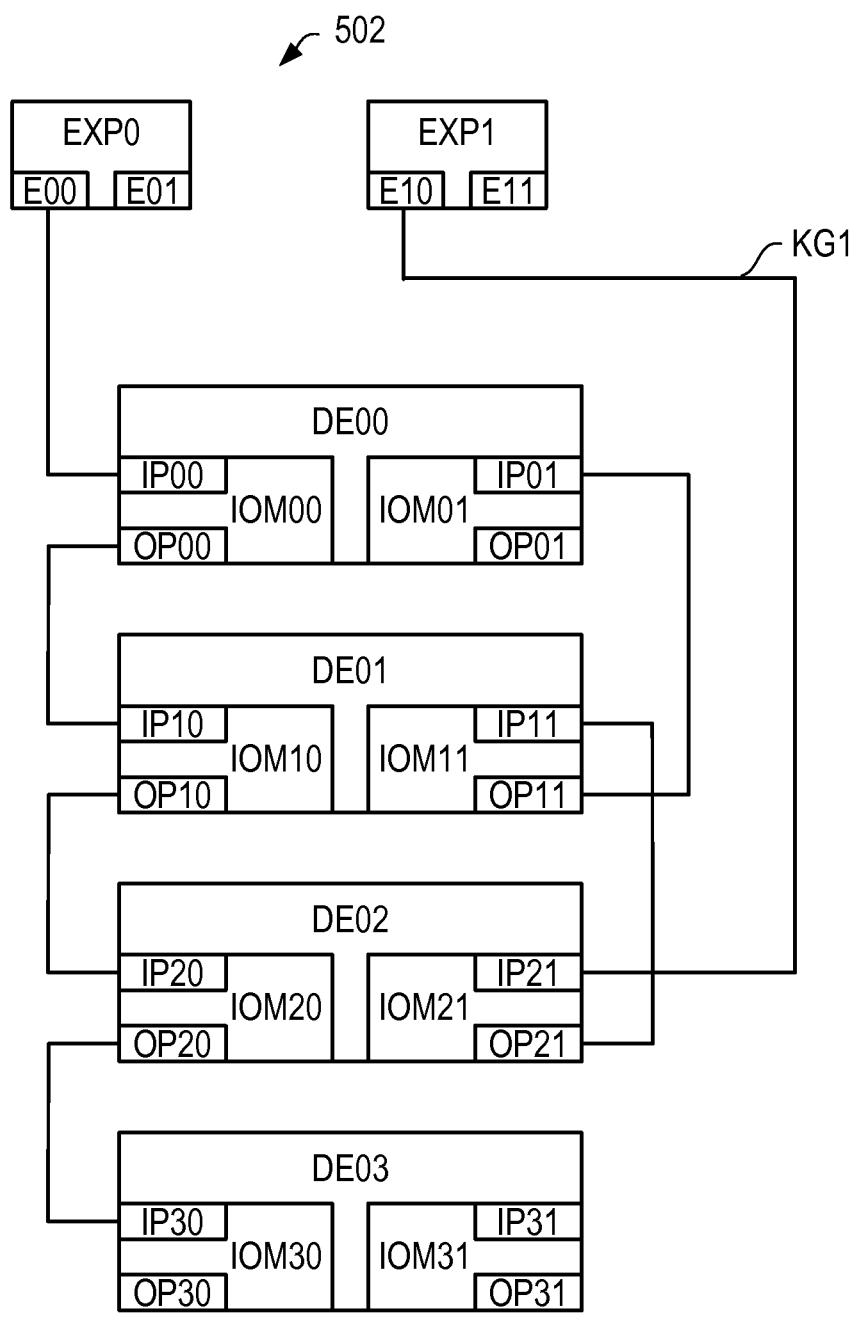
FIG. 9 is a diagram illustrating another example of the connection configuration of the RAID device which is in a normal state according to the second embodiment.

Next, descriptions will be made on a connection configuration in which equipment are erroneously connected in the RAID device 13 which is in the normal state with reference to FIG. 9. FIG. 9 is a diagram illustrating another example of the connection configuration of the RAID device which is in a normal state according to the second embodiment. A connection configuration 502 indicates a connection configuration in which equipment are erroneously connected in the normal operation mode 601. The connection configuration 502 is the connection configuration deviated from the IOM configuration information 211 or the connection configuration 501, and is a state of becoming an erroneous connection.

For example, in the connection configuration 502, a link KG1 which is not present in the IOM configuration information 211 exists, and links K11 and K12 that are present in the IOM configuration information 211 do not exist. The inconsistency between the connection configuration 502 and the IOM configuration information 211, that is, the connection configuration in which equipment are erroneously connected may be detected by, for example, the execution of a discovery command by the RAID device 13.

Descriptions will be made on a process of adding the DE04 to the RAID device 13 with reference to FIG. 10 to FIG. 25. First, descriptions will be made on a preparation step for adding the DE04 to the RAID device 13 with reference to FIG. 10. Then, descriptions will be made on a 0-system addition process with reference to FIG. 11 to FIG. 13, a 1-system saving process with reference to FIG. 14 to FIG. 19, a 1-system addition process with reference to FIG. 20 to FIG. 22, and a 1-system recovery process with reference to FIG. 23 to FIG. 25.

Figure 10:
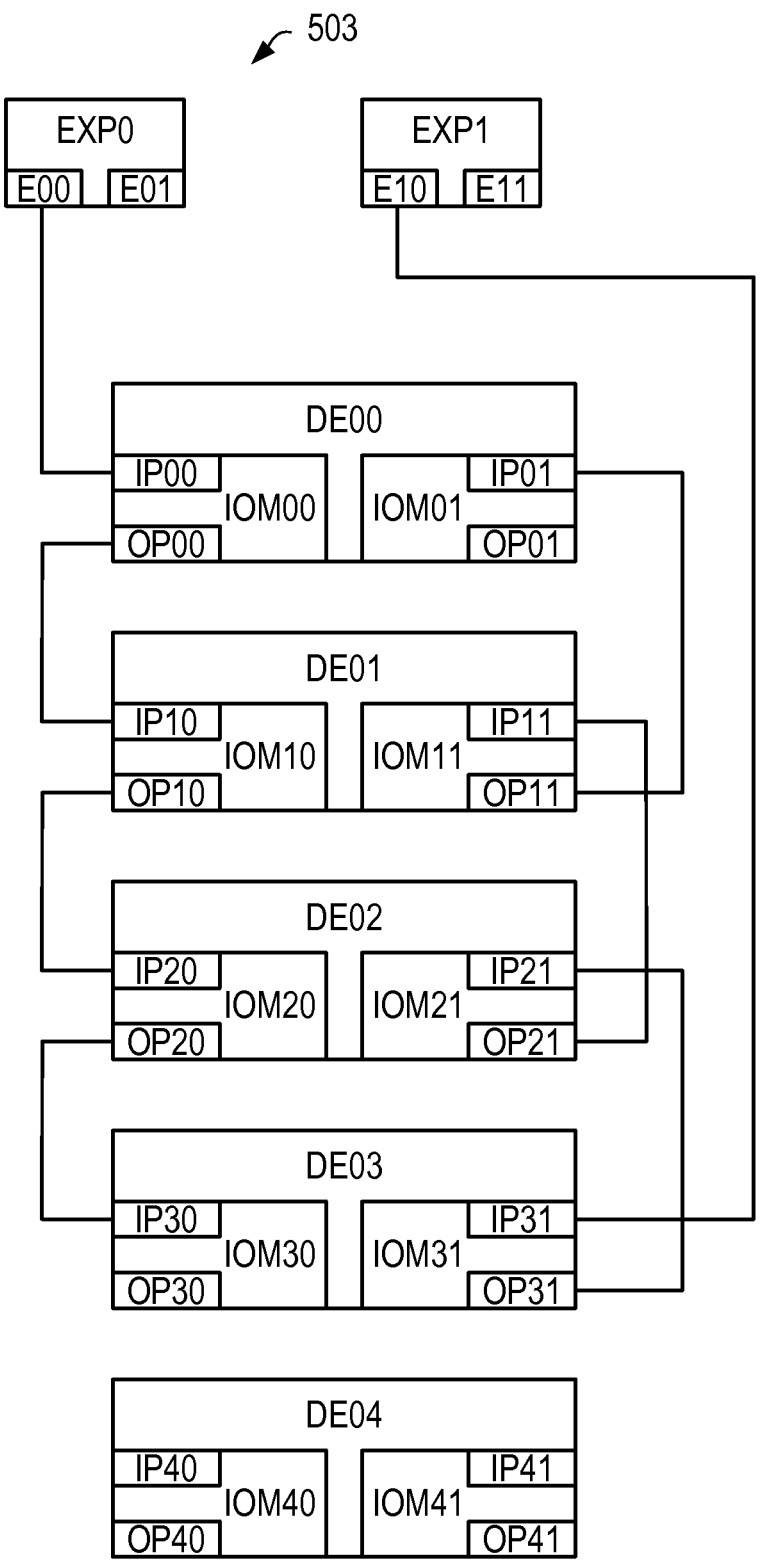
FIG. 10 is a diagram illustrating an example of the connection configuration of the RAID device according to the second embodiment.

FIG. 10 is a diagram illustrating an example of the connection configuration of the RAID device according to the second embodiment. A connection configuration 503 is a connection configuration formed in the preparation step for adding the DE04 to the RAID device 13 and one of connection configurations that may exist in the maintenance mode 602. The DE04 is provided in the vicinity of the DE03 to be connected to the terminating device of the 0-system.

Further, in the maintenance mode 602, the RAID device 13 receives the identification information of the DE04 to be added in advance and permits an inconsistency regarding the DE0 even when the inconsistency between the IOM configuration information 211 and the DE configuration information 221 exists in the connection configuration.

Figure 11:
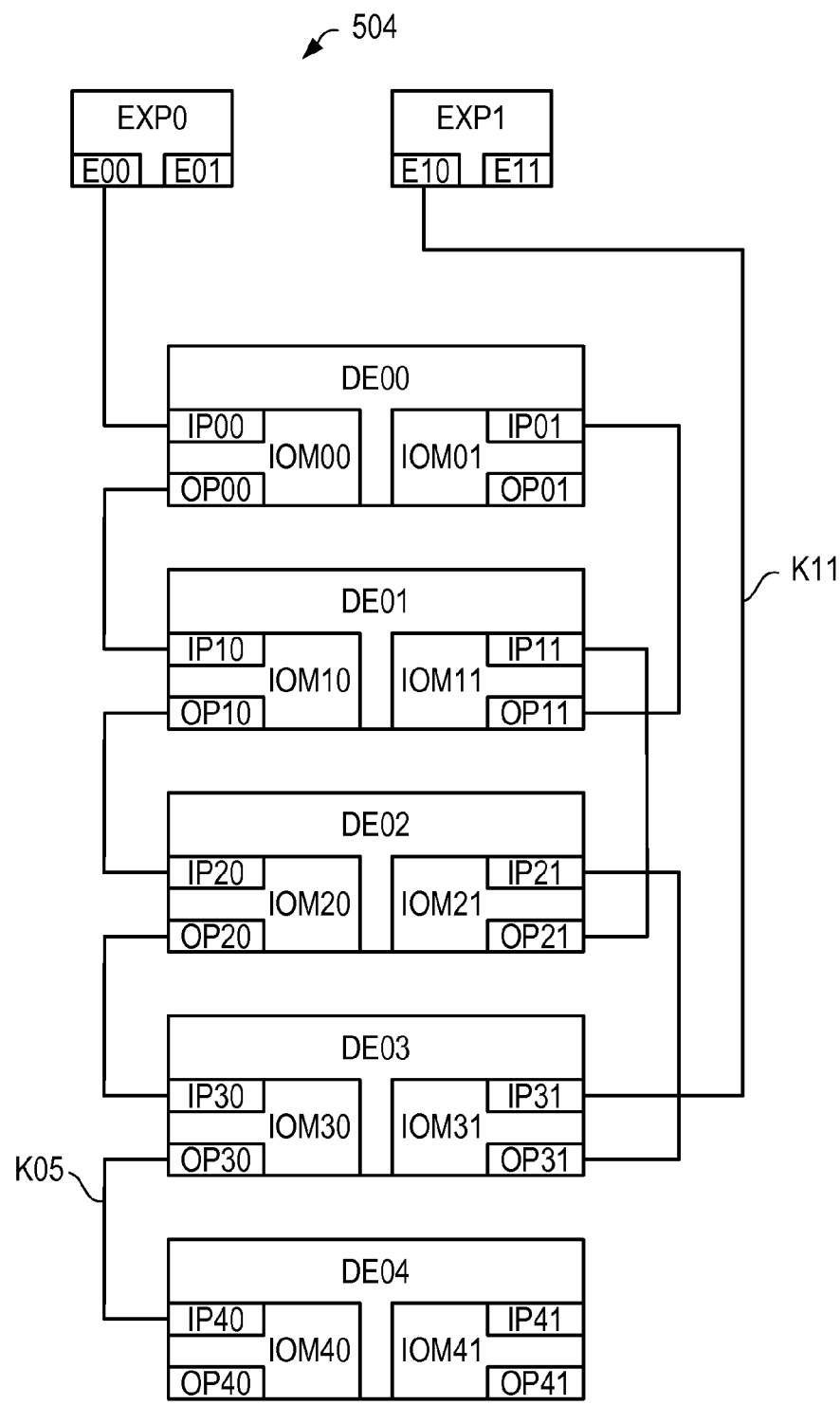
FIG. 11 is a diagram illustrating an example of the connection configuration of the RAID device which is in an addition state according to the second embodiment.

Descriptions will be made on the 0-system addition process with reference to FIG. 11 to FIG. 13. First, descriptions will be made on a connection configuration which is in an addition state. FIG. 11 is a diagram illustrating an example of the connection configuration in an addition state according to the second embodiment.

A connection configuration 504 is a connection configuration formed by adding the DE04 to the connection configuration 503 through a link K05 in the 0-system and is one of the connection configurations that may exist in the maintenance mode 602. Further, the RAID device 13 is being operated in the maintenance mode 602.

The port E10 of the expander EXP1 is connected to the In port IP31 of the DE03 through the link K11. As the work to be performed after the connection, in the RAID device 13, a connection needs to be changed from the In port IP31 to the In port IP41 as a connection destination of the 1-system at the port E10. Therefore, the release of the link K11 is needed in the next working in the RAID device 13.

Next, descriptions will be made on IOM list information which corresponds to the connection configuration 504 with reference to FIG. 12. FIG. 12 is a diagram illustrating an example of IOM list information according to the second embodiment. The IOM list information 212 is information capable of specifying the equipment to be connected to the expander 23 for each port. The IOM list information 212 is information generated by detecting the equipment connected to the expander 23 for each port in the connection configuration 504. The IOM list information 212 is used for confirming the connection configuration by being compared with the IOM configuration information 211.

The IOM configuration information 212 includes identification information of the equipment detected for each port of the expander 23 and information capable of specifying the detection sequence. In the field for the 0-system port E00 identification information, the identification information of respective equipment are arranged in an order of equipment detected from the port E00 of the expander 23 in the 0-system. Further, in the field for the 1-system port E10 identification information, the identification information of respective equipment are arranged in an order of equipment detected from the port E10 of the expander 23 in the 1-system. Further, in the field for the 1-system port E11 identification information, the identification information of respective equipment are arranged in an order of equipment detected from the port E11 of the expander 23 in the 1-system. However, since the equipment is not detected from the port E11 of the expander 23 of the 1-system in the 1-system port E11 identification information, the 1-system port E11 identification information does not include any identification information. Further, descriptions on the port E01 of the expander 23 of the 0-system will be omitted.

Further, since the DE04 is connected through the link K05, the 0-system port E00 identification information includes the identification information of the DE04 as a fifth item in the detection sequence. In the meantime, since a link is not yet established for the DE04, the 1-system port E10 identification information does not include the identification information of the DE04.

Further, even though the IOM list information 212 has a portion which is not consistent with the IOM configuration information 211, the IOM list information 212 permits identification information of the added DE04 as long as the inconsistent portion corresponds to inconsistency on the DE04 to be added.

Next, descriptions will be made on DE list information which corresponds to the connection configuration 504 with reference to FIG. 13. FIG. 13 is a diagram illustrating an example of the DE list information according to the second embodiment. A DE list information 222 is information capable of specifying the IOM 26 of each DE 20 for each connection system. The DE list information 222 is information capable of being configured from the IOM list information 212 and is generated by, for example, the RAID device 13 after the IOM list information 212 is generated. The DE list information 222 includes the DE identification information, the 0-system IOM identification information, and the 1-system IOM identification information.

Further, since the DE04 is connected by the link K05, the 0-system IOM identification information includes identification information IOM40 of the IOM 26 of the DE04. In the meantime, since a link is not yet established for the DE04 in the 1-system, the 1-system IOM identification information does not include the identification information of the IOM 26 of the DE04.

Figure 14:
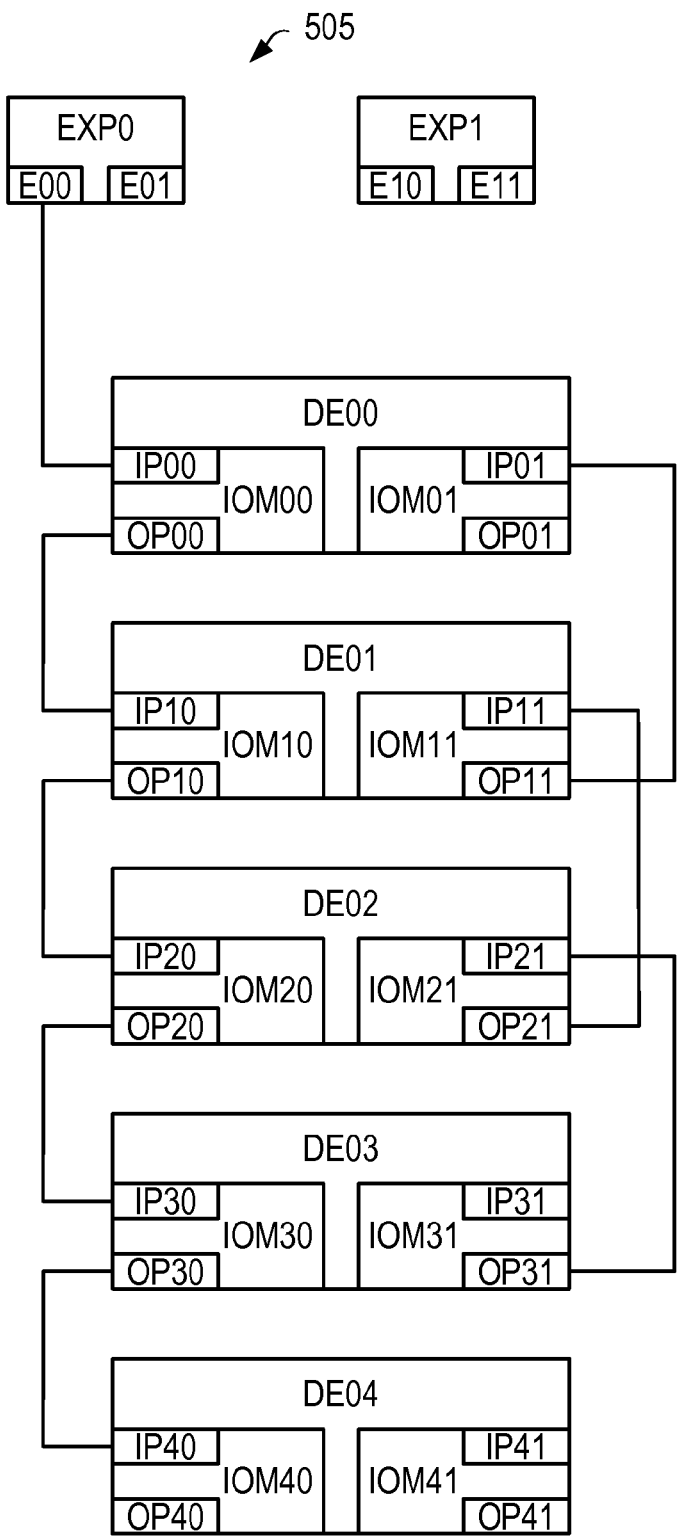
FIG. 14 is a diagram illustrating another example of the connection configuration of the RAID device according to the second embodiment.

Further, even though the IOM list information 212 has a portion which is not consistent with the IOM configuration information 221, the IOM list information 212 permits identification information of the added DE04 as long as the inconsistent portion corresponds to inconsistency on the DE04 to be added. Descriptions will be made on the release of link of the 1-system in the 1-system saving process with reference to FIG. 14 to FIG. 16. First, descriptions will be made on the connection configuration of the RAID device 13 with reference to FIG. 14. FIG. 14 is a diagram illustrating another example of the connection configuration of the RAID device according to the second embodiment.

The connection configuration 505 is the connection configuration of the RAID device 13 in which the link K11 of the 1-system is released from the connection configuration 504, and is one of connection configurations that may exist in the redundant configuration mode 603. Further, the connection configuration 505 is the connection configuration after the operation state has transited from the maintenance mode 602 to the redundant configuration mode 603.

Since the link K11 of the 1-system is released, the connection configuration 505 is the connection configuration which is not permitted in the maintenance mode 602. Since the connection configuration 505 is the connection configuration that may exist in the redundant configuration mode 603, the DE list information when the redundant configuration mode flag becomes ON is used as a criterion for determining whether the connection configuration 505 is the connection configuration to be permitted. Therefore, it is determined that the connection configuration 505 is the connection configuration permitted by the DE list information 222.

Accordingly, an access redundancy may be secured in the redundant configuration mode 603 in the RAID device 13. Next, descriptions will be made on the IOM list information which corresponds to the connection configuration 505 with reference to FIG. 15. FIG. 15 is a diagram illustrating another example of the IOM list information according to the second embodiment.

The IOM list information 213 is information generated by detecting the connected equipment for each port of the expander 23 in the connection configuration 505. The IOM list information 213 is used for confirming the connection configuration by comparing with the IOM configuration information 211. Further, in the IOM list information 213, since the link K11 is released even though the IOM list information 213 has the same configuration as that of the IOM list information 212, the 1-system port E10 identification information and the 1-system port E11 identification information do not include any identification information. The IOM list information 213 indicates that even though the IOM list information 213 has a portion which is not consistent with the IOM configuration information 211, the connection configuration 505 is permitted as long as the inconsistent portion corresponds to the inconsistency on the DE04 to be added or the inconsistency on securing of the redundant configuration.

Next, descriptions will be made on the DE list information which corresponds to the connection configuration 505 with reference to FIG. 16. FIG. 16 is a diagram illustrating another example of DE list information according to the second embodiment. The DE list information 223 is a copy of the DE list information 222 being maintained in the redundant configuration mode 603. Since it is determined whether the connection configuration 505 is the connection configuration to be permitted by the DE list information 223 which is a copy of the DE list information 222, the connection configuration 505 is permitted in the redundant configuration mode 603.

Figure 17:
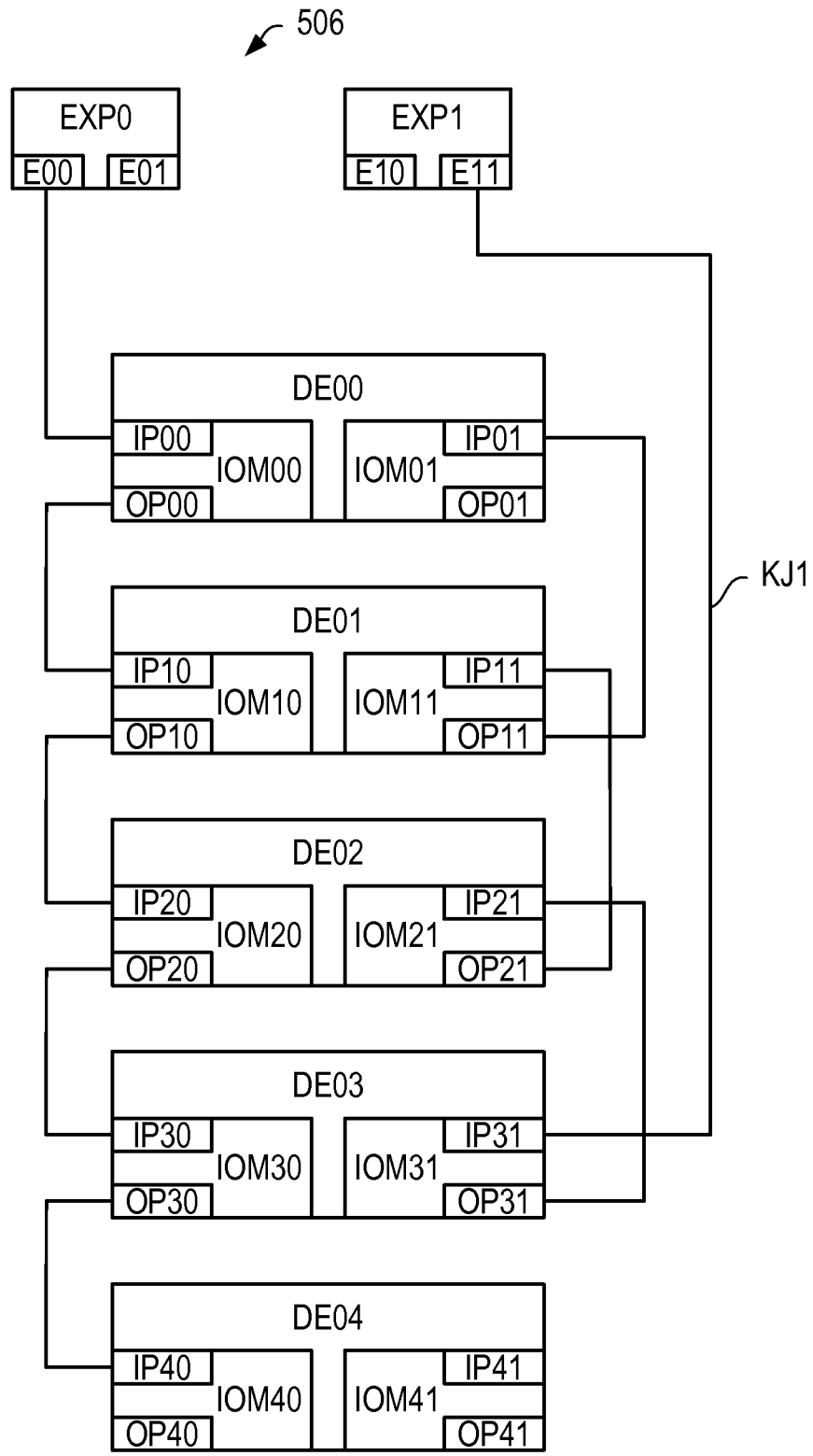
FIG. 17 is a diagram illustrating still another example of the connection configuration of the RAID device according to the second embodiment.

Descriptions will be made on the connection in the redundant configuration of the 1-system saving process with reference to FIG. 17 to FIG. 19. First, descriptions will be made on the connection configuration of the RAID device 13 with reference to FIG. 17. FIG. 17 is a diagram illustrating still another example of the connection configuration of the RAID device according to the second embodiment.

The connection configuration 506 is the connection configuration of the RAID device 13 in which a redundant link KJ1 is connected and is one of connection configurations that may exist in the redundant configuration mode 603. The redundant link KJ1 is a link which secures the access redundancy for the existing DE (DE00, DE01, DE02, and DE03). The RAID device 13 may access the DE00, DE01, DE02, and DE03 in two systems configured by the 0-system and the 1-system by the connection of the redundant link KJ1. The redundant link KJ1 connects the Out port E11 of the expander EXP1 with the In port IP31 of the DE03 in the 1-system. The redundant link KJ1 is a link for the connection configuration which is different from the access path between the DE 20 and the controller module 21 in the normal operation mode 601. The redundant link KJ1 is a link which accesses the expander 23 without using the Out port 25 used in the normal operation mode 601.

Further, the RAID device 13 alleviates the chances of determining that the connection configuration is abnormal to permit the connection of the redundant link in the redundant configuration mode 603. Accordingly, the RAID device 13 may limit a lost time of the redundancy during the work process.

Next, descriptions will be made on the IOM list information which corresponds to the connection configuration 506 with reference to FIG. 18. FIG. 18 is a diagram illustrating still another example of the IOM list information according to the second embodiment. The IOM list information 214 is information generated by detecting the connected equipment for each port of the expander 23 in the connection configuration 506. The IOM list information 214 is used for confirming the connection configuration by being compared with the IOM configuration information 211. Further, in the IOM list information 214, since the link is released even though the IOM list information 214 has the same configuration as that of the IOM list information 212, the 1-system port E10 identification information does not include any identification information. Further, since the redundant link KJ1 is connected, identification information of respective equipment is arranged in an order of equipment detected from the port E11 in the 1-system port E11 identification information. The IOM list information 214 indicates that even though the IOM list information 214 has a portion which is not consistent with the IOM configuration information 211, the connection configuration 506 is permitted as long as the inconsistent portion corresponds to the inconsistency on the DE04 to be added or the inconsistency on securing of the redundant configuration.

Next, descriptions will be made on the DE list information which corresponds to the connection configuration 506 with reference to FIG. 19. FIG. 19 is a diagram illustrating still another example of DE list information according to the second embodiment. The DE list information 224 is a copy of the DE list information 222 being maintained in the redundant configuration mode 603. The DE list information 224 indicates that since it is determined whether the connection configuration 505 is the connection configuration to be permitted by the DE list information 224 which is a copy of the DE list information 222, the connection configuration 506 is permitted in the redundant configuration mode 603.

Figure 20:
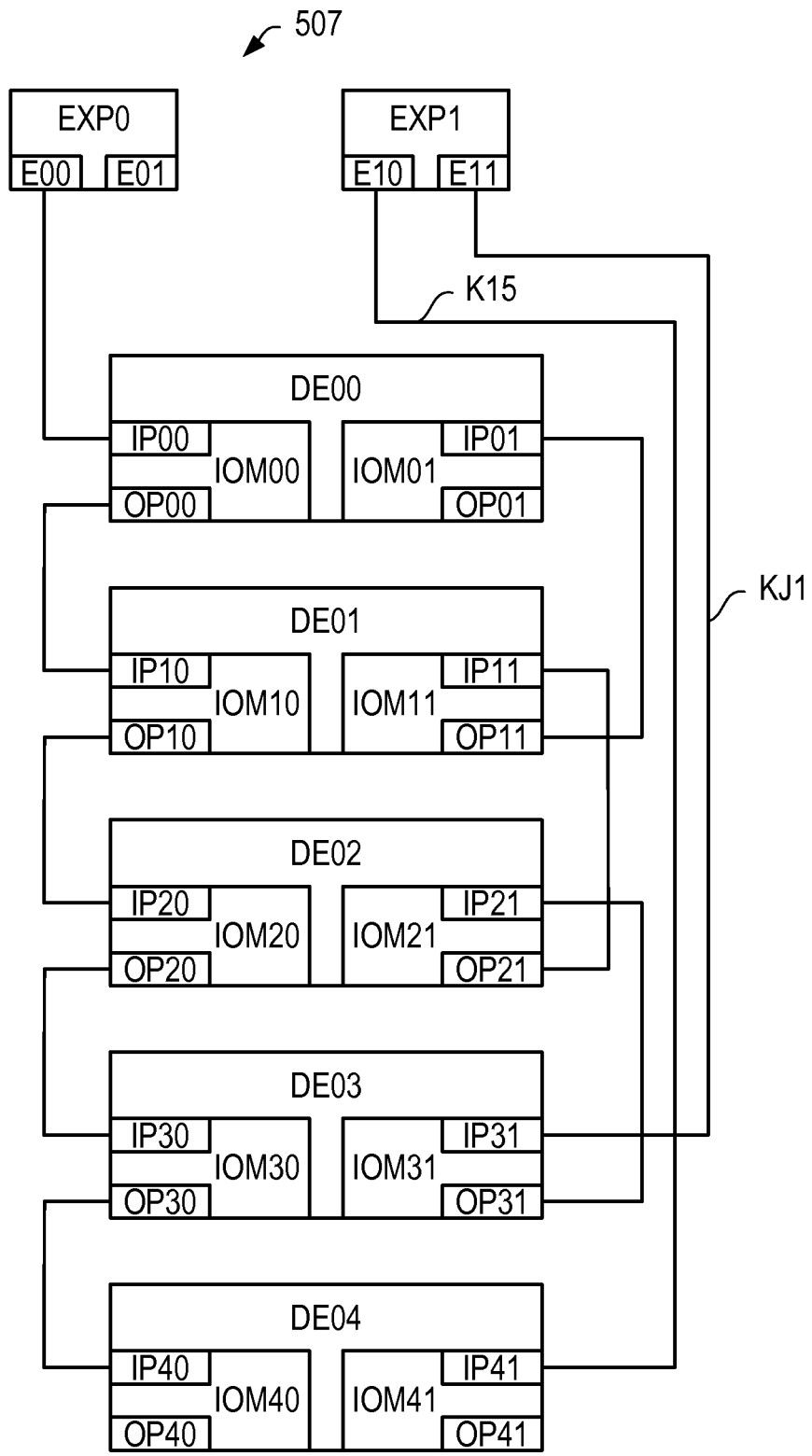
FIG. 20 is a diagram illustrating still yet another example of the connection configuration of the RAID device according to the second embodiment.

Descriptions will be made on the 1-system addition process with reference to FIG. 20 to FIG. 22. First, descriptions will be made on the connection configuration of the RAID device 13 with reference to FIG. 20. FIG. 20 is a diagram illustrating still yet another example of the connection configuration of the RAID device according to the second embodiment.

The connection configuration 507 is the connection configuration after the operation mode has transited from the redundant configuration mode 603 to the maintenance mode 602 by confirming the connection of the redundant link KJ1. The connection configuration 507 is the connection configuration in which the added DE04 and the expander EXP1 are connected with the link K15, and is one of connection configurations that may exist in the maintenance mode 602. The link K15 connects the Out port E10 of the expander EXP1 and the In port IP41 of the DE04 in the 1-system.

Next, descriptions will be made on the IOM list information which corresponds to the connection configuration 507 with reference to FIG. 21. FIG. 21 is a diagram illustrating still yet another example of the IOM list information according to the second embodiment. The IOM list information 215 is information generated by detecting the connected equipment for each port of the expander 23 in the connection configuration 507. The IOM list information 215 is used for confirming the connection configuration by being compared with the IOM configuration information 211. Further, in the IOM list information 215, since the link K15 is connected even though the IOM list information 215 has the same configuration as that of the IOM list information 212, identification information of respective equipment are arranged in an order of the equipment detected from the port E10 in the 1-system port E10 identification information. Further, since the redundant link KJ1 is connected, identification information of respective equipment is arranged in an order of the equipment detected from the port E11 in the 1-system port E11 identification information.

Further, the IOM list information 215 indicates that even though the IOM list information 214 has a portion which is not consistent with the IOM configuration information 211, the connection configuration 507 is permitted as long as the inconsistent portion corresponds to the inconsistency on the DE04 to be added. Further, the IOM list information 215 indicates that since the identification information of the DE 20 are matched with each other in the 0-system and the 1-system among the 0-system port E00 identification information, the 1-system port E10 identification information, and the 1-system port E11 identification information, the connection configuration 507 is permitted.

Next, descriptions will be made on the DE list information which corresponds to the connection configuration 507 with reference to FIG. 22. FIG. 22 is a diagram illustrating still yet another example of DE list information according to the second embodiment. The DE list information 225 is information capable of being configured from the IOM list information 215 in the maintenance mode 602. The DE list information 225 includes the identification information of the DE 20, the identification information of the IOM 26 of the 0-system, and the identification information of the IOM 26 of the 1-system. Further, the DE list information 225 indicates that even though the IOM list information 214 has a portion which is not consistent with the DE list information 221, the connection configuration 507 is permitted as long as the inconsistent portion corresponds to the inconsistency on the DE04 to be added.

Figure 23:
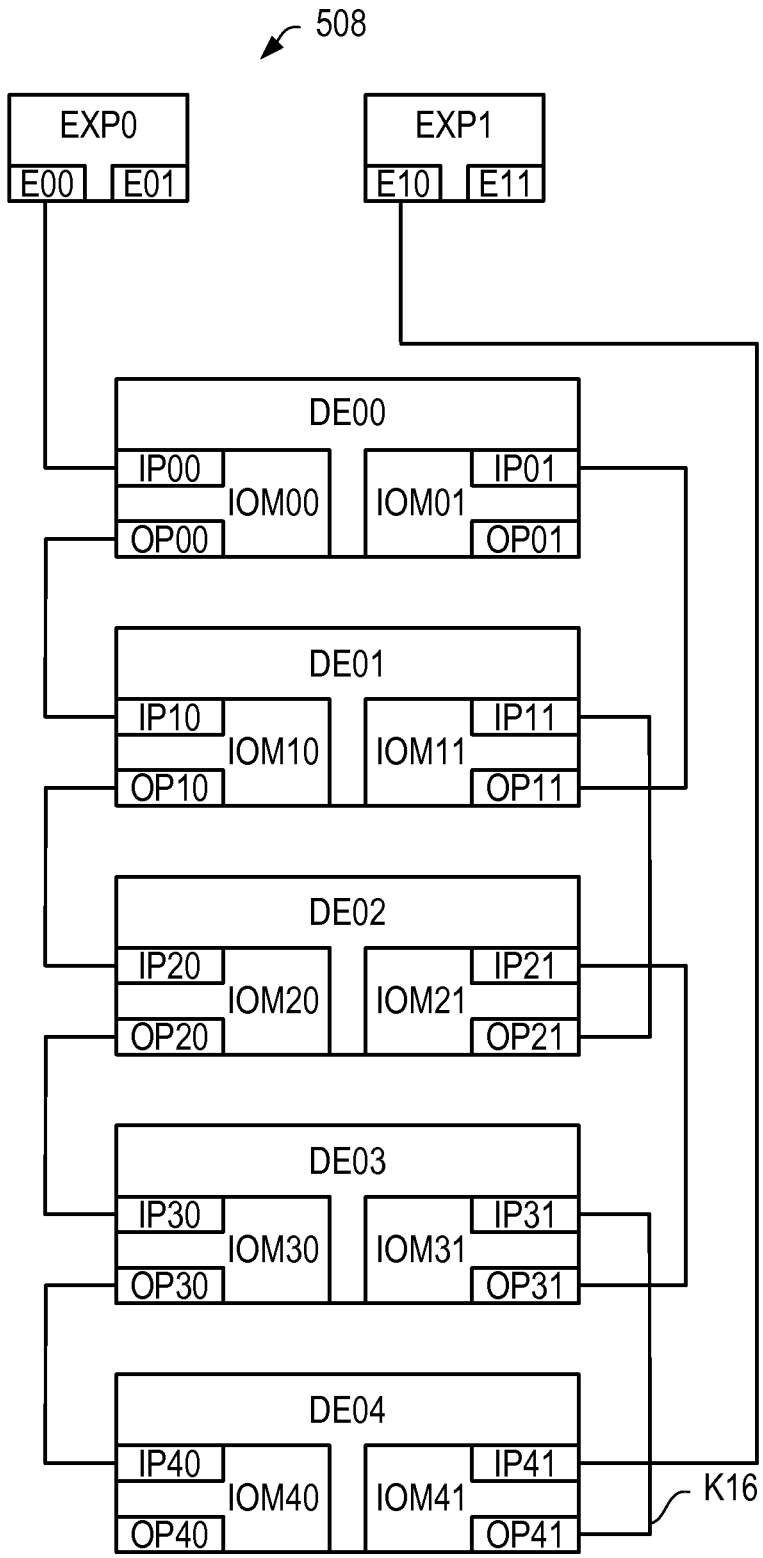
FIG. 23 is a diagram illustrating still yet another example of the connection configuration of the RAID device according to the second embodiment.

Descriptions will be made on the 1-system recovery process with reference to FIG. 23 to FIG. 25. First, descriptions will be made on the connection configuration of the RAID device 13 with reference to FIG. 23. FIG. 23 is a diagram illustrating still yet another example of the connection configuration of the RAID device according to the second embodiment.

The connection configuration 508 is the connection configuration in which the redundant link KJ1 is released, and the added DE04 and the existing DE03 are connected with the link K16. The connection configuration 508 is one of the connection configurations that may reside in the maintenance mode 602. The link K16 connects the Out port OP41 of the DE04 with the In port IP31 of the DE03 in the 1-system. Further, the connection configuration 508 is the connection configuration in which the operation state has transited from the maintenance mode 602 to the normal operation mode 601, and the addition of the DE04 is completed by confirming the connection of the link K16.

Next, descriptions will be made on the IOM list information which corresponds to the connection configuration 508 with reference to FIG. 24. FIG. 24 is a diagram illustrating still yet another example of the IOM list information according to the second embodiment. The IOM list information 216 is information generated by detecting the connected equipment for each port of the expander 23 in the connection configuration 508. The IOM list information 216 is used for confirming the connection configuration by being compared with the IOM configuration information 211. Further, in the IOM list information 216, since the link K16 is connected even though the IOM list information 216 has the same configuration as that of the IOM list information 212, identification information of respective equipment are arranged in an order of the equipment detected from the port E10 in the 1-system port E10 identification information. Further, since the link is released, the 1-system port E11 identification information does not include any identification information. The IOM list information 216 indicates that even though the IOM list information 216 has a portion which is not consistent with the IOM configuration information 211, the connection configuration 508 is permitted as long as the inconsistent portion corresponds to the inconsistency on the DE04 to be added and securing the redundant configuration.

Next, descriptions will be made on the DE list information which corresponds to the connection configuration 508 with reference to FIG. 25. FIG. 25 is a diagram illustrating still yet another example of DE list information according to the second embodiment. The DE list information 226 is information capable of being configured from the IOM list information 216 in the maintenance mode 602. The DE list information 226 includes the identification information of the DE 20, the identification information of the IOM 26 of the 0-system, and the identification information of the IOM 26 of the 1-system. Further, the DE list information 226 indicates that even though the DE list information 226 has a portion which is not consistent with the DE list information 221, the connection configuration 507 is permitted as long as the inconsistent portion corresponds to the inconsistency on the DE04 to be added.

Figure 26:
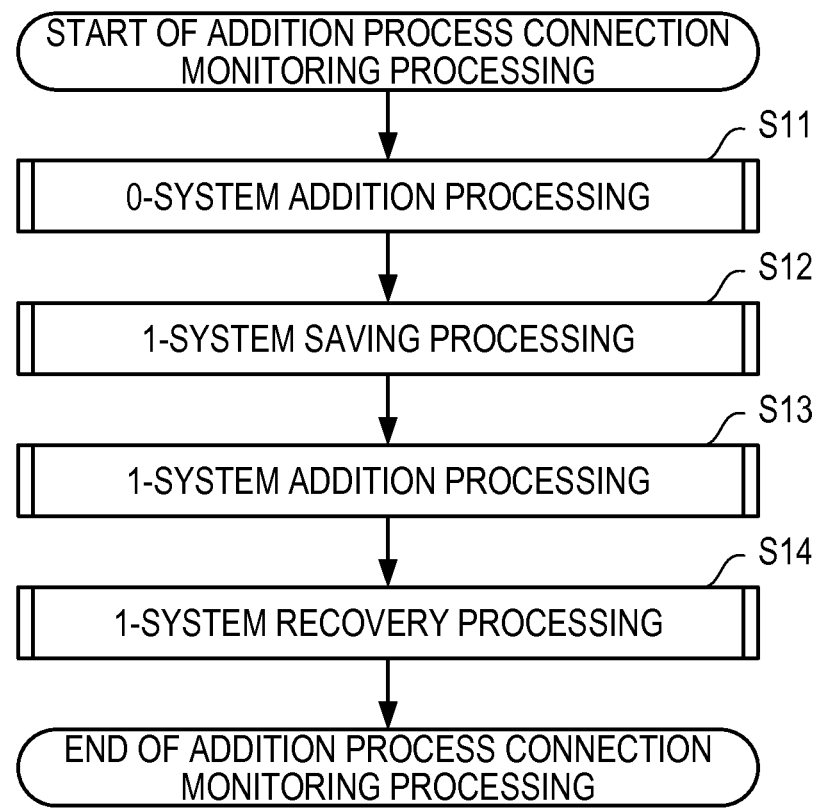
FIG. 26 is a flowchart illustrating an addition process connection monitoring processing according to the second embodiment.

Descriptions will be made on a monitoring processing of the connection of the DE 20 during an addition process in the RAID device 13 with reference to FIG. 26 to FIG. 30. First, descriptions will be made on an addition process connection monitoring processing of the second embodiment with reference to FIG. 26. FIG. 26 is a flowchart illustrating an addition process connection monitoring processing according to the second embodiment.

The addition process connection monitoring processing is a processing in which the RAID device 13 monitors the connection established during the process of adding an equipment. The control unit (processor 15) of the RAID device 13 receives an instruction to monitor the connection to execute the addition process connection monitoring processing.

The control unit executes the 0-system addition processing (Operation S11). The 0-system addition processing is a processing in which the RAID device 13 confirms the connection of the DE 20 intended to add to the 0-system. The 0-system addition processing will be described later with reference to FIG. 27.

The control unit executes the 1-system saving processing (Operation S12). The 1-system saving processing is a processing in which the RAID device 13 suppresses the I/O of the 1-system, release the link of the 1-system, and confirms the connection of the redundant configuration. The 1-system saving processing will be described later with reference to FIG. 28.

The control unit executes the 1-system addition processing (Operation S13). The 1-system addition processing is a processing in which the RAID device 13 confirms the connection of the DE 20 added by a link belonged to the 1-system. The 1-system addition processing will be described later with reference to FIG. 29.

The control unit executes the 1-system recovery processing (Operation S14). The 1-system recovery processing is a processing in which the RAID device 13 confirms the connection of link of the 1-system and the release of the redundant configuration, recovers the I/O of the 1-system, and ends the maintenance mode. The 1-system recovery processing will be described later with reference to FIG. 30.

Figure 27:
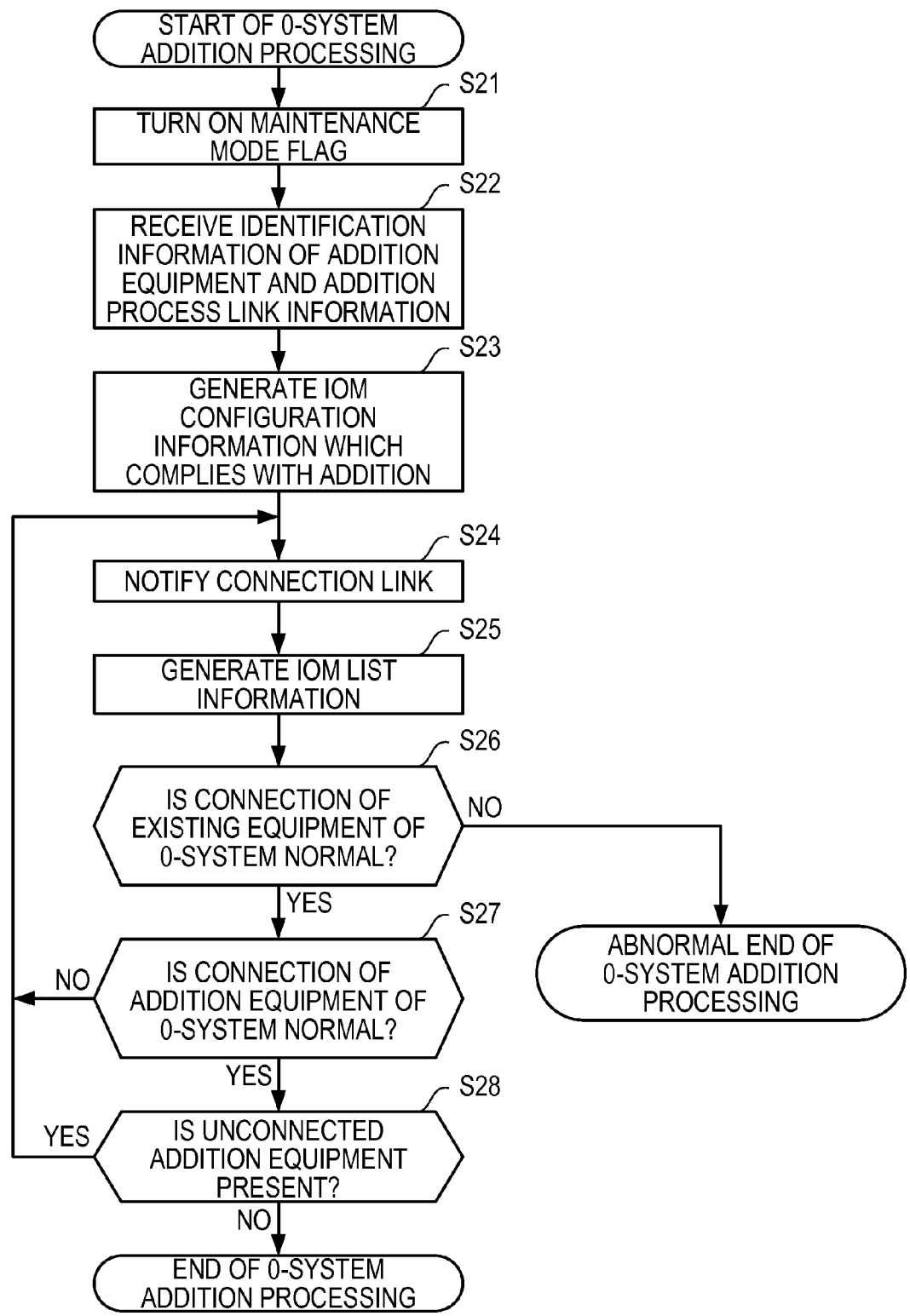
FIG. 27 is a flowchart illustrating a 0-system addition processing according to the second embodiment.

Next, descriptions will be made on a flowchart of the 0-system addition processing according to the second embodiment with reference to FIG. 27. FIG. 27 is a flowchart illustrating a 0-system addition processing according to the second embodiment.

The 0-system addition processing is a processing of confirming the connection of an addition equipment (an equipment intended to be added) to the 0-system. The 0-system addition processing is a processing executed by the control unit (processor 15) of the RAID device 13 at Operation S11 of the connection monitor processing.

The control unit turns a maintenance mode flag ON (Operation S21). Accordingly, the RAID device 13 transits from the normal operation mode 601 to the maintenance mode 602. The control unit receives the identification information of addition equipment and the addition process link information (information of link in the addition process) (Operation S22). The addition process link information is the identification information about the connection sites or the release sites (Out port 25, In port 27, and Output port 28) of the link in the process of addition. The links in the process of addition includes the link which connects the addition equipment, the link which connects or releases an existing equipment (equipment having been existed), and the redundant link.

Further, the addition process link information may include information indicating which link is to be connected or released at which timing or information about a work procedure in the addition process such as information indicating which link is to be connected or released in what sequence.

The control unit generates IOM configuration information which complies with the addition (Operation S23). For example, the control unit may generate the IOM configuration information which complies with the addition based on the received identification information of the addition equipment and the IOM configuration information 211. The control unit adds the identification information of the addition equipment in the field of the 0-system port E00 identification information as the fifth (last) item in the detection sequence. The control unit adds the identification information of the addition equipment in the field of the 1-system port E10 identification information as the first item in the detection sequence and shifts the original identification information.

The control unit notifies a connection link (Operation S24). The notification of the connection link is to notify a connection site of the addition equipment in the 0-system. The connection site of the 0-system is identification information of an Out port of a terminating equipment of the 0-system and identification information of an In port of the DE 20 intended to be added. Further, the control unit may notify the connection site by displaying information on a display unit or turning ON a lighting device such as an LED (Light Emitting Diode) provided to be corresponded to the Out ports 25 and 28 or the In port 27 of the RAID device 13.

Further, the control unit may notify the connection site by transmitting information through a network.

Further, the control unit may notify information about the work procedure along with notifying the connection site of the link which belongs to the 0-system. Further, the information about the work procedure may include identification information of the equipment, information of instruction to connect or release the link, information of connection or release timing of the link, or precaution at a configuration modification work. Further, the control unit may notify a notification unit (e.g., display unit, LED, terminal) of the work procedure.

The control unit generates IOM list information (Operation S25). For example, the control unit may detect, by the discovery command, that the DE04 intended to be added to the 0-system is connected to the connection configuration 503 through the link K05 and generate the IOM list information 212 in the connection configuration 504.

Further, the control unit detects the connection or the release of the link and issues the discovery command. The control unit determines whether the connection of the existing equipment belonged to the 0-system is normal or not (Operation S26). The control unit compares the IOM configuration information with the IOM list to determine whether the connection of the existing equipment in the 0-system is normal. For example, the control unit may compare the IOM configuration information 211 with the IOM list information 212 for the identification information of the existing equipment to determine whether the connection of the existing equipment is normal. Further, the control unit may compare the DE configuration information 221 with the DE list information 222 for the identification information of the existing equipment to determine whether the connections of the 0-system and the 1-system for each of the existing DE 20 are normal or not.

The 0-system addition processing performed by the control unit proceeds to Operation S27 when the existing equipment of the 0-system is normal, and the 0-system addition processing proceeds to an abnormal end of the 0-system addition processing when the connection of the 0-system is not normal. When the 0-system addition processing is abnormally ended, the control unit performs a processing for a case of an occurrence of abnormality such as notifying an abnormality occurrence or outputting an error log, and ends the connection monitoring process.

The control unit determines whether the connection of the addition equipment belonged to the 0-system is normal or not (Operation S27). For example, the control unit may determine that the connection is normally established for the identification information of the 0-system when the IOM configuration information which complies with the addition is identical with the IOM list information. Further, since the RAID device 13 is in the maintenance mode 602, the RAID device 13 compares the IOM configuration information 211 with the IOM list information 212, permits inconsistency in the identification information of the added DE 20 even when the inconsistency exists, and determines that the connection of the added DE 20 is normal.

The 0-system addition processing performed by the control unit proceeds to Operation S28 when the connection in the 0-system is normally established and proceeds to Operation S24 when the connection in the 0-system is not normally established. The control unit determines whether an unconnected addition equipment is present (Operation S28). For example, the control unit compares the IOM configuration information which complies with the addition with the IOM list information to determine whether an unconnected DE 20 is present or not. The 0-system addition processing performed by the control unit proceeds to Operation S24 when the unconnected addition equipment is present, and ends the 0-system addition processing when the unconnected addition equipment is not present.

Figure 28:
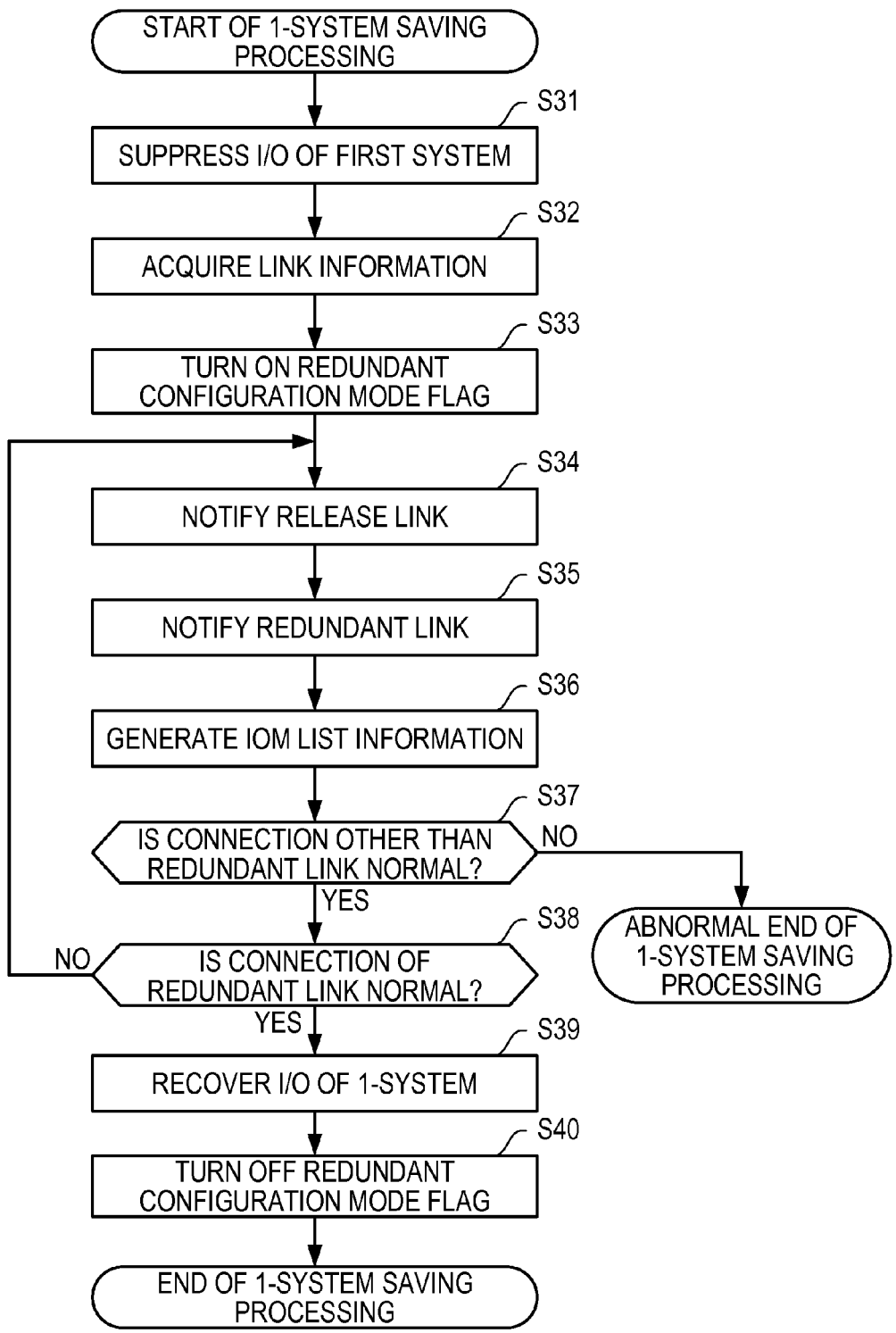
FIG. 28 is a flowchart illustrating a 1-system saving processing.

As described above, the RAID device 13 may monitor the connection configuration using, for example, the IOM configuration information, the IOM list information, the DE configuration information, the DE list information, or the addition process link information. Next, descriptions will be made on a flowchart of the 1-system saving processing according to the second embodiment with reference to FIG. 28. FIG. 28 is diagram illustrating a flowchart of a 1-system saving processing.

The 1-system saving processing is a processing in which the I/O of the 1-system is suppressed, the link of the 1-system is released, and connection of the redundant configuration is confirmed. The 1-system saving processing is a processing executed by the control unit (processor 15) of the RAID device 13 at Operation S12 of the connection monitoring process.

The control unit suppresses the I/O of the 1-system (Operation S31). Accordingly, the control unit switches the I/O being processed at two systems composed of the 0-system and the 1-system to the I/O to be processed only in one system of the 0-system. Therefore, the RAID device 13 may limit the influence on the I/O process caused by the release of the link of the 1-system.

The control unit acquires link information (Operation S32). The link information includes the link information of a release link and the link information of a connection link. The link information of the release link is the identification information of the release sites (Out port 25, In port 27, and Out port 28) of the link received at Operation S22. The link information of the redundant link is the identification information of the connection sites (Out port 25, In port 27, and Out port 28) of the redundant link received at Operation S22. For example, the control unit acquires the identification information of a port belonged to a path which makes an access to the existing DE 20 redundant as the information of the connection sites for the connection by the redundant link.

The control unit turns ON the redundant configuration mode flag (Operation S33). The control unit transits from the maintenance mode 602 to the redundant configuration mode 603. The control unit maintains the DE list information when the redundant configuration mode flag is turned ON.

The control unit may determine the connection configuration by referencing the DE list information maintained at the time when the redundant configuration mode flag is turned ON even when the IOM list information is changed according to the connection modification in the redundant configuration mode 603. Accordingly, the control unit permits the connection of the redundant link in the redundant configuration mode 603.

The control unit performs a notification of the release link (Operation S34). For example, the control unit notifies the identification information of the Out port 25 of the expander 23 connected with the DE 20 and the identification information of the In port 27 of the DE 20 connected with the expander 23 in the 1-system.

Further, the connection configuration 505 is a connection configuration in which the release link is released from the connection configuration 504. Further, the link K11 is a release link. Further, the control unit may notify information about the work procedure along with notifying the release site of the link which belongs to the 1-system. For example, the control unit notifies a message such as "A link is excluded from a port of the expander of the 1-system." as the information about the work procedure. The control unit may maintain the information about the work procedure in a memory or acquire the information through a network.

The RAID device 13 may reduce an occurrence of erroneous connection by notifying the release site of the link or the information about the work procedure. The control unit notifies the redundant link (Operation S35). For example, in the 1-system, the control unit notifies the identification information of the In port of the existing DE 20 connected with the expander 23 and the identification information of the Out port 25 (Out port 25 being emptied in the normal operation mode 601) of the expander 23, for which the identification information of equipment is not yet acquired in the IOM configuration information.

Further, the connection configuration 506 is a connection configuration in which the redundant link is connected. Further, the link KJ1 is a redundant link. Further, the control unit may notify the information about the work procedure. For example, the RAID device 13 may notify a message such as "A redundant link is connected based on connection site information" as the information about the work procedure.

The RAID device 13 may reduce an occurrence of erroneous connection by notifying the release site of the link or the information about the work procedure. The control unit generates the IOM list information (Operation S36). For example, the control unit may detect, by the discovery command, that the redundant link KJ1 is connected and generate the IOM list information 214 in the connection configuration 506.

The control unit determines whether the connection other than the redundant link is normal or not (Operation S37). The control unit may compare the IOM configuration information and the IOM list information to determine whether the connection other than the connection site of the redundant link is normal or not. When it is determined that the connection is normal, the 1-system saving processing performed by the control unit proceeds to Operation S38 and otherwise, when the connection is not normal, the control unit ends the 1-system saving processing.

When the 1-system saving processing is abnormally ended, the control unit performs a processing for an occurrence of abnormality such as notifying an abnormality occurrence or outputting an error log, and ends the connection monitoring process. The control unit determines whether the connection of the redundant link is normal or not (Operation S38). For example, the control unit may compare the identification information of the connection site of the redundant link received at Operation S22 with the identification information of the IOM list information to determine whether the connection of the redundant link is normal or not. When it is determined that the connection of the redundant link is normal, the 1-system saving processing performed by the control unit proceeds to Operation S39 and otherwise, when the connection is not normal, the 1-system saving processing proceeds to Operation S34.

The control unit recovers the I/O of the 1-system (Operation S39). Even though the I/O was being processed only in one system of the 0-system, the control unit recovers the I/O of the 1-system in accordance with an establishment of the connection of the redundant link and processes the I/O in two systems composed of the 0-system and the 1-system.

The control unit turns OFF the redundant configuration mode flag (Operation S40). The control unit transits from the redundant configuration mode 603 to the maintenance mode 602. The control unit ends the 1-system saving processing.

As described above, the RAID device 13 may connect the redundant link to reduce the time required for accessing the existing DE 20 only by the link of the 0-system (only one system) and achieve redundancy in accessing to the existing DE 20 (accessing in two systems).

As described above, the RAID device 13 transits from the maintenance mode 602 to the redundant configuration mode 603 such that the connection of the redundant link is permitted and the redundancy in I/O accessing to an equipment that has an impaired redundancy in I/O access is secured.

Figure 29:
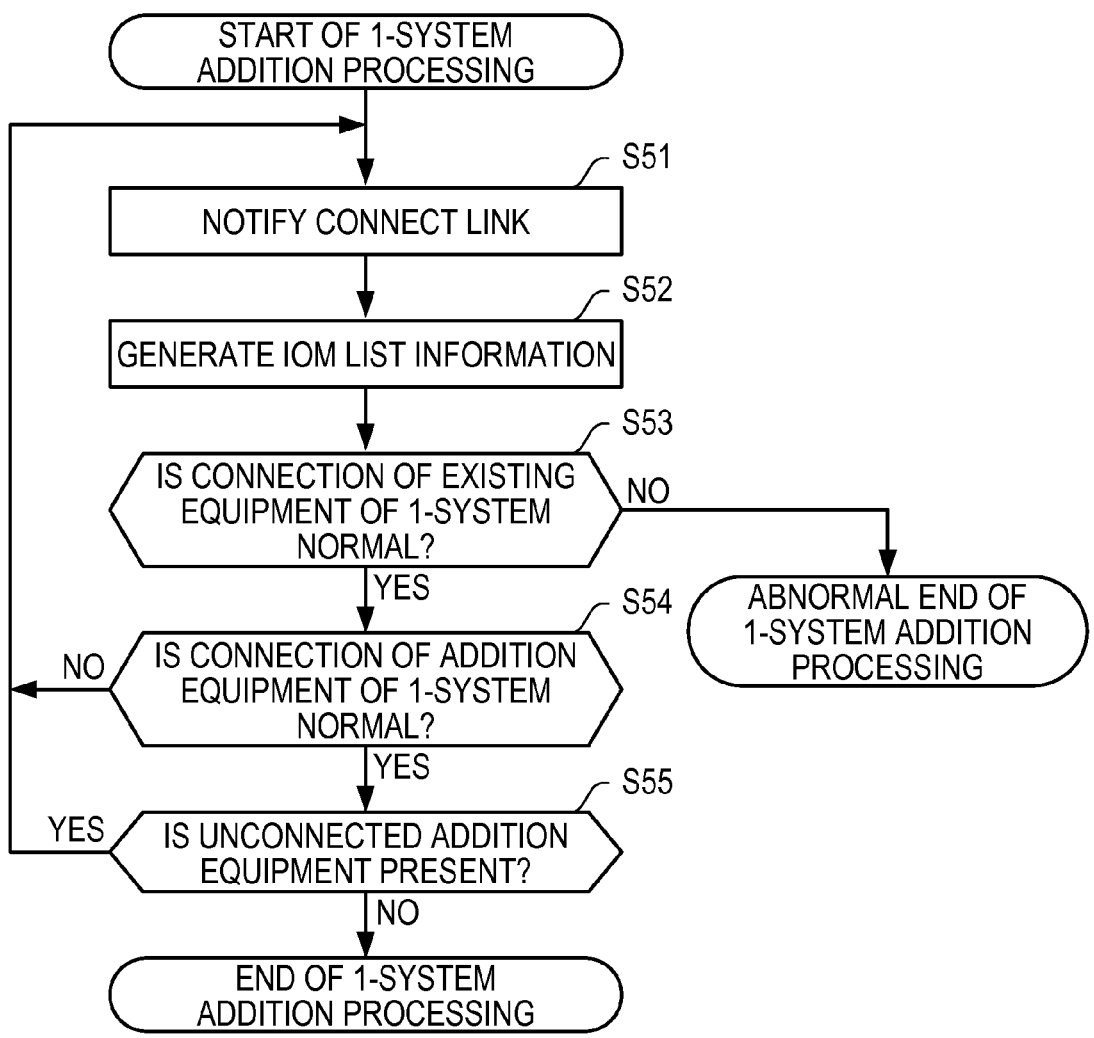
FIG. 29 is a flowchart illustrating a 1-system addition processing.

As described above, the RAID device 13 may secure an access to the equipment by the redundant link during an addition work to secure a time required for the addition work of the equipment. Next, descriptions will be made on a flowchart of the 1-system addition processing according to the second embodiment with reference to FIG. 29. FIG. 29 is a flowchart illustrating a 1-system addition processing.

The 1-system addition processing is a processing of confirming the connection of the DE 20 added by the link which belongs to the 1-system. The 1-system addition processing is a processing executed by the control unit (processor 15) of the RAID device 13 at Operation S12 of the connection monitoring process.

The control unit notifies the connection link (Operation S51). For example, the control unit notifies the identification information of the In port of the added DE 20 and the identification information of the Out port 25 of the expander 23 in the 1-system. Further, the control unit may notify the identification information of the site to be connected by the link based on the link information received at Operation S22. Further, the control unit may notify the information about the work procedure along with notifying the site to be connected by the link.

The control unit generates the IOM list information (Operation S52). For example, the control unit may detect, by the discovery command, that the DE04 is connected to the 1-system through the link K15 and generate the IOM list information 215 in the connection configuration 507.

The control unit determines whether the connection of the existing equipment belonged to the 1-system is normal or not (Operation S53). For example, regarding the 1-system, the control unit may compare the identification information of the IOM configuration information 211 with the identification information of the IOM list information 215 to determine whether the connection of the existing equipment is normal or not.

When it is determined that the connection of the existing equipment belonged to the 1-system is normal, the 1-system addition processing performed by the control unit proceeds to Operation S54 and otherwise, when the connection of the existing equipment belonged to the 1-system is not normal, the 1-system addition processing proceeds to an abnormal end of the 1-system addition processing. When the 1-system addition processing is abnormally ended, the control unit performs a processing for an occurrence of abnormality such as notifying an abnormality occurrence or outputting an error log, and ends the connection monitoring process.

The control unit determines whether the connection of addition equipment of the 1-system is normal or not (Operation S54). For example, regarding the identification information of the 1-system, the control unit may compare the IOM configuration information, which complies with the addition, with the IOM list information 215 to determine whether the connection of the addition equipment is normal or not.

When it is determined that the addition equipment is normally connected, the 1-system addition processing performed by the control unit proceeds to Operation S55 and otherwise, when the addition equipment is not normally connected, the 1-system addition processing proceeds to Operation S51. The control unit determines whether an unconnected addition equipment is present (Operation S55). For example, the control unit compares the IOM configuration information which complies with the addition with the IOM list information to determine whether an unconnected DE 20 is present or not.

Figure 30:
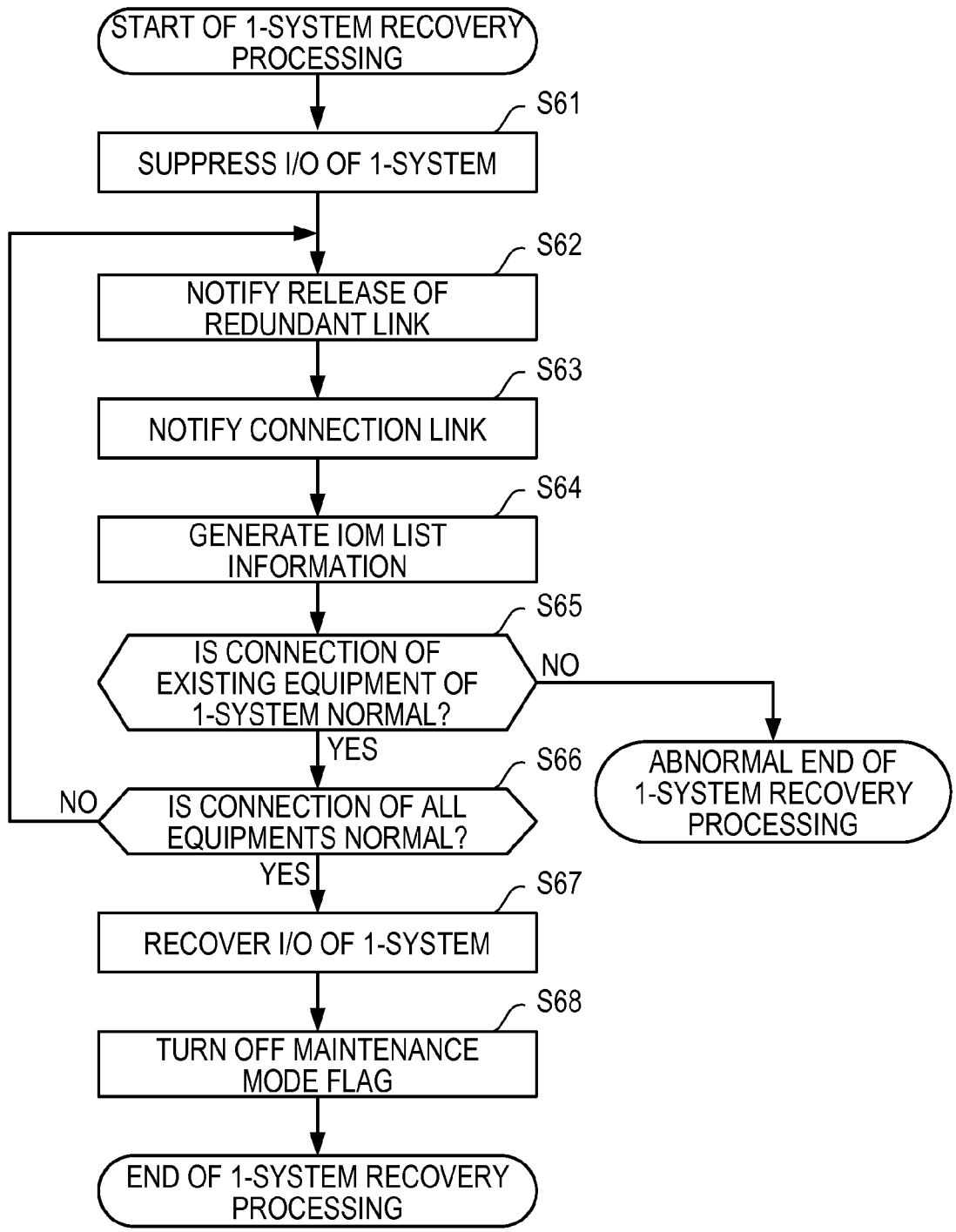
FIG. 30 is a flowchart illustrating a 1-system recovery processing.

The 1-system addition processing performed by the control unit proceeds to Operation S51 when it is determined that the unconnected addition equipment is present, and ends the 1-system addition processing when the unconnected addition equipment is not present. Next, descriptions will be made on a flowchart of the 1-system recovery processing according to the second embodiment with reference to FIG. 30. FIG. 30 is a flowchart illustrating the 1-system recovery processing according to the second embodiment.

The 1-system recovery processing is a processing in which the connection of the link of the 1-system and the release of the redundant configuration are confirmed, the I/O of the 1-system is recovered, and the maintenance mode is ended. The 1-system recovery processing is a processing executed by the control unit (processor 15) of the RAID device 13 at Operation S14 of the connection monitoring process.

The control unit suppresses the I/O of the 1-system (Operation S61). Accordingly, the control unit switches the I/O being processed at two systems composed of the 0-system and the 1-system to the I/O to be processed only in one system of the 0-system. Therefore, the RAID device 13 may limit the influence on the I/O process caused by the release of the link of the 1-system.

The control unit notifies the release of the redundant link (Operation S62). For example, the control unit notifies the identification information of the port connected by the redundant link KJ1. Further, the control unit may notify the information about the work procedure at the time when notifying the site for which the redundant link is to be released. For example, the control unit may notify a message such as "A redundant link is released." as the information about the work procedure.

The control unit notifies the connection link (Operation S63). For example, the control unit notifies, in the 1-system, the identification information of the Out port of the DE 20 to be added and the identification information of the In port 25 of the existing DE 20 connected to the DE 20 to be added. Further, the control unit may notify the identification information of the site for which the link is connected based on the link information received at Operation S22.

Further, the control unit may notify the identification information about the work procedure at the time when notifying the site for which the link is connected. For example, the control unit may notify a message such as "A connecting addition equipment is connected with the existing equipment of the 1-system after confirming the release of the redundant link." as the information about the work procedure.

The control unit generates the IOM list information (Operation S64). For example, the control unit may detect, by the discovery command, that the DE04 is connected to the 1-system through a link K16 and generate the IOM list information 216 in the connection configuration 508.

The control unit determines whether the connection of the existing equipment of the 1-system is normal or not (Operation S65). For example, the control unit may compare the IOM configuration information and the IOM list information to determine whether the connection of the existing equipment is normal or not. When it is determined that the addition equipment of the 1-system is normally connected, the 1-system recovery processing performed by the control unit proceeds to Operation S66 and otherwise, when the addition equipment of the 1-system is not normally connected, the 1-system recovery processing proceeds to an abnormal end of the 1-system recovery processing.

When the 1-system recovery processing is abnormally ended, the control unit performs a processing for an occurrence of abnormality such as notifying an abnormality occurrence or outputting an error log, and ends the connection monitoring process. The control unit determines whether the connection of all equipment is normal or not (Operation S66). For example, the control unit may compare the IOM configuration information, which complies with the addition, with the IOM list information to determine whether the connection of all equipment is normal or not. When it is determined that the connection of all equipment is normal, the 1-system recovery processing performed by the control unit proceeds to Operation S67 and otherwise, when the connection of all equipment is not normal, the 1-system recovery processing proceeds to Operation S62.

Further, when it is determined that the connection is not normal, the control unit may perform a processing such as notifying the occurrence of error. The control unit recovers the I/O of the 1-system (Operation S67). Even though the I/O was being processed only in one system of the 0-system, the control unit recovers the I/O of the 1-system in accordance with the connection of all equipment normally established and processes the I/O in two systems composed of the 0-system and the 1-system.

The control unit turns OFF the maintenance mode flag (Operation S68). The RAID device 13 transits from the maintenance mode 602 to the normal operation mode 601. The control unit ends the 1-system recovery processing.

With this configuration, the RAID device 13 switches the operation state to allow the connection of the redundant link in the process of adding the equipment. Accordingly, the RAID device 13 may reduce an operation time during which the access redundancy is impaired for the existing equipment in the addition process. Accordingly, the RAID device 13 may secure a work time while maintaining the redundancy in accessing to the existing equipment.

Further, the processing described in the second embodiment may be applied to an information processing device in which two or more connection routes are established.

Third Embodiment

Figure 31:
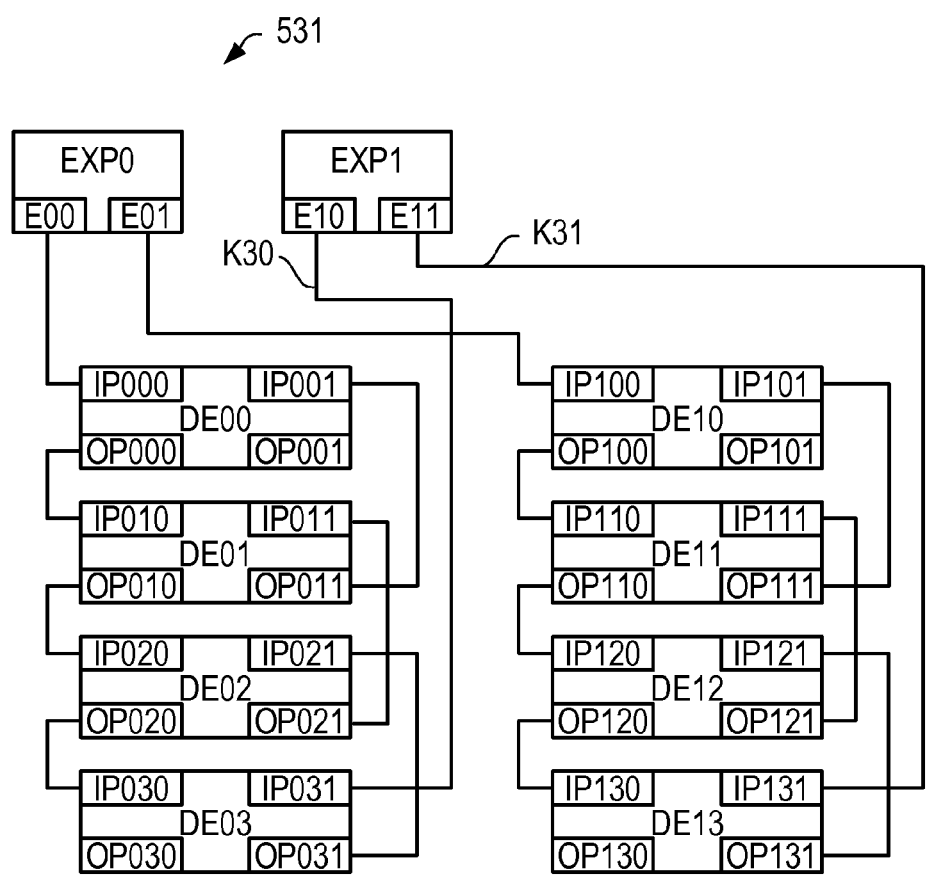
FIG. 31 is a diagram illustrating an example of a connection configuration of a RAID device according to a third embodiment.
Figure 32:
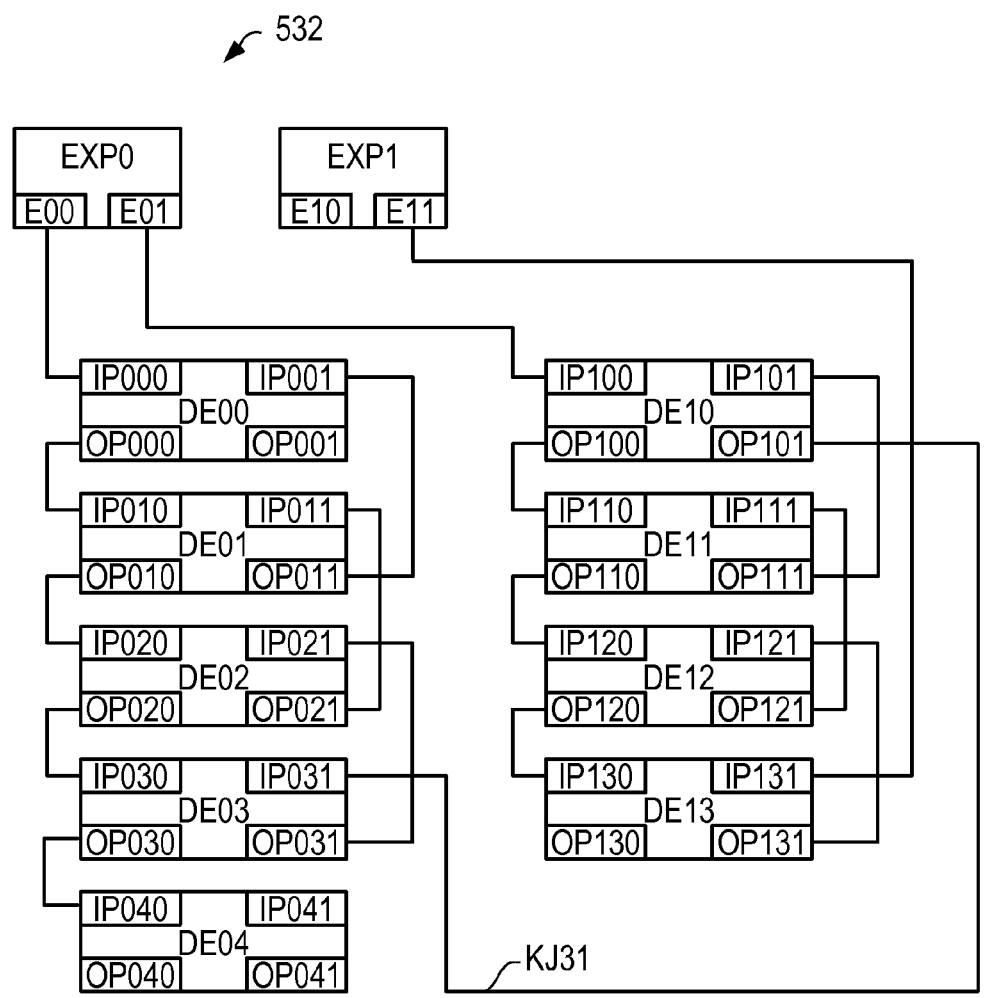
FIG. 32 is a diagram illustrating another example of the connection configuration of the RAID device according to the third embodiment.
Figure 33:
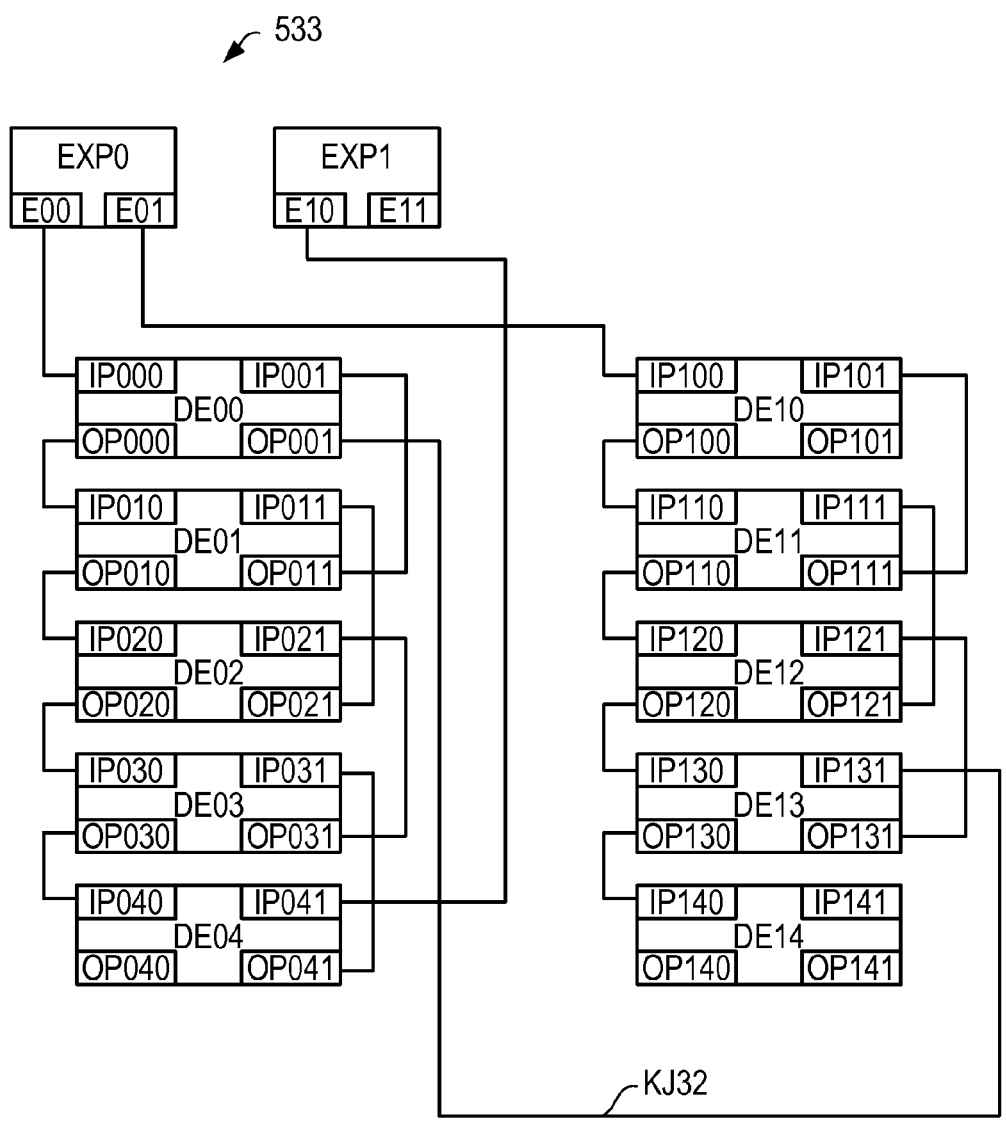
FIG. 33 is a diagram illustrating still another example of the connection configuration of the RAID device according to the third embodiment.

Descriptions will be made on the connection of the redundant link in the connection configuration of a RAID device in which the DE 20 is arranged in two column with reference to FIG. 31 to FIG. 33. First, descriptions will be made on the connection configuration of the normal operation mode 601 in the RAID device 13 in which the DE 20 is arranged in two columns with reference to FIG. 31. The expander 23, DE 20, Out port 25, In port 27, and Out port 28 are denoted using identification information instead of reference symbols in order to simplify the description. Further, the denoting by identification information as described above is similarly applied to FIG. 32 and FIG. 33.

A connection configuration 531 is a connection configuration in which the expanders EXP0 and EXP1 and the DE (DE00, DE01, DE02, DE03, DE10, DE11, DE12, and DE13) are connected with each other. Further, descriptions of the IOM 26 included in the DE 20 will be omitted.

The port E00 of the expander EXP0 connects the DE00, DE01, DE02, and DE03 in a cascade configuration in a forward direction. The port E01 of the expander EXP0 connects the DE10, DE11, DE12, and DE13 in a cascade configuration in a forward direction. The port E10 of the expander EXP0 connects the DE00, DE01, DE02, and DE03 in a cascade configuration in a backward direction. The port E11 of the expander EXP0 connects the DE10, DE11, DE12, and DE13 in a cascade configuration in a backward direction.

A link K30 is a link to be released at the time when the DE 20 intended to be added is connected to the DE03. A link K31 is a link to be released at the time when the DE 20 intended to be added is connected to the DE13.

Further, the DE 20 which corresponds to the terminating device in the cascade connection configuration has a port which is not connected (empty port). For example, the DE03 which corresponds to the terminating device of the 0-system has an empty port OP030. Further, the DE13 which corresponds to the terminating device of the 0-system has an empty port OP130. Further, the DE00 which corresponds to the terminating device of the 1-system has an empty port OP001. Further, the DE10 which corresponds to the terminating device of the 1-system has an empty port OP101.

Next, descriptions will be made on the connection configuration of the RAID device according to the third embodiment with reference to FIG. 32. FIG. 32 is a diagram illustrating an example of the connection configuration of the RAID device according to the third embodiment. The connection configuration 532 illustrated in the diagram indicates a connection configuration of the redundant link KJ31 when the DE04 is added.

The DE04 intended to be added needs to be connected with the expander EXP1 in the normal operation mode 601. Therefore, the link K30 in the connection configuration 531 is released in the connection configuration 532. Even though the redundancy in accessing to the DE (DE00, DE01, DE02, and DE03) is impaired due to the release of the link K30 in the RAID device 13, the connection may be established by the redundant link KJ31 such that the access redundancy may be secured in the RAID device 13. The redundant link KJ31 is a link which connects the In port IP031 of the DE03 and the Out port OP101 of the DE10 which is an empty port of the 1-system capable of being accessed with the expander EXP1.

With this configuration, the RAID device 13 connects the redundant link using an empty port capable of being accessed with the controller module 21 such that it becomes possible to secure the access redundancy for the existing DE 20 for which the access redundancy is impaired during the addition work.

Further, the RAID device 13 may perform a process of adding the DE 20 by applying the method described in the second embodiment. Next, descriptions will be made on a connection configuration according to the third embodiment with reference to FIG. 33. FIG. 33 is a diagram illustrating still another example of the connection configuration of the RAID device according to the third embodiment.

The connection configuration 533 illustrated in the diagram indicates a connection configuration of the redundant link KJ33 when the DE04 is added to the RAID device 13. The DE04 intended to be added needs to be connected with the expander EXP1 in the normal operation mode 601. Therefore, the link K31 in the connection configuration 531 is released in the connection configuration 532. Even though the redundancy in accessing to the DE (DE00, DE01, DE02, and DE03) is impaired due to the release of the link K31 in the RAID device 13, the connection may be established by the redundant link KJ32 such that the access redundancy may be secured in the RAID device 13. The redundant link KJ32 is a link which connects the In port IP131 of the DE13 and the Out port OP001 of the DE00 which is an empty port of the 1-system capable of being accessed with the expander EXP1.

With this configuration, the RAID device 13 connects the redundant link using an empty port capable of being accessed with the controller module 21 such that it becomes possible to secure the access redundancy for the existing DE 20 for which the access redundancy is impaired during the addition work.

Further, the RAID device 13 may perform a process of adding the DE 20 by applying the method described in the second embodiment. Further, the RAID device 13 may set the identification information of a port which becomes a connection destination of the redundant link in advance. Further, the RAID device 13 may determine a connection destination of the redundant link using other method.

As described above, even in a state where an empty port of the expander 23 does not exist, the RAID device 13 may establish the connection by the redundant link using an empty port of the DE 20 and secure an access path to the DE 20 for which the redundancy is impaired during the addition.

Further, the RAID device 13 may perform a process of adding the DE 20 by applying the method described in the second embodiment. With this configuration, the RAID device 13 switches the operation state to allow the connection of the redundant link in the process of adding the equipment. Accordingly, the RAID device 13 may reduce an operation time during which the access redundancy is impaired for the existing equipment in the addition process. Accordingly, the RAID device 13 may secure a work time while maintaining the redundancy in accessing to the existing equipment.

Fourth Embodiment

Figure 34:
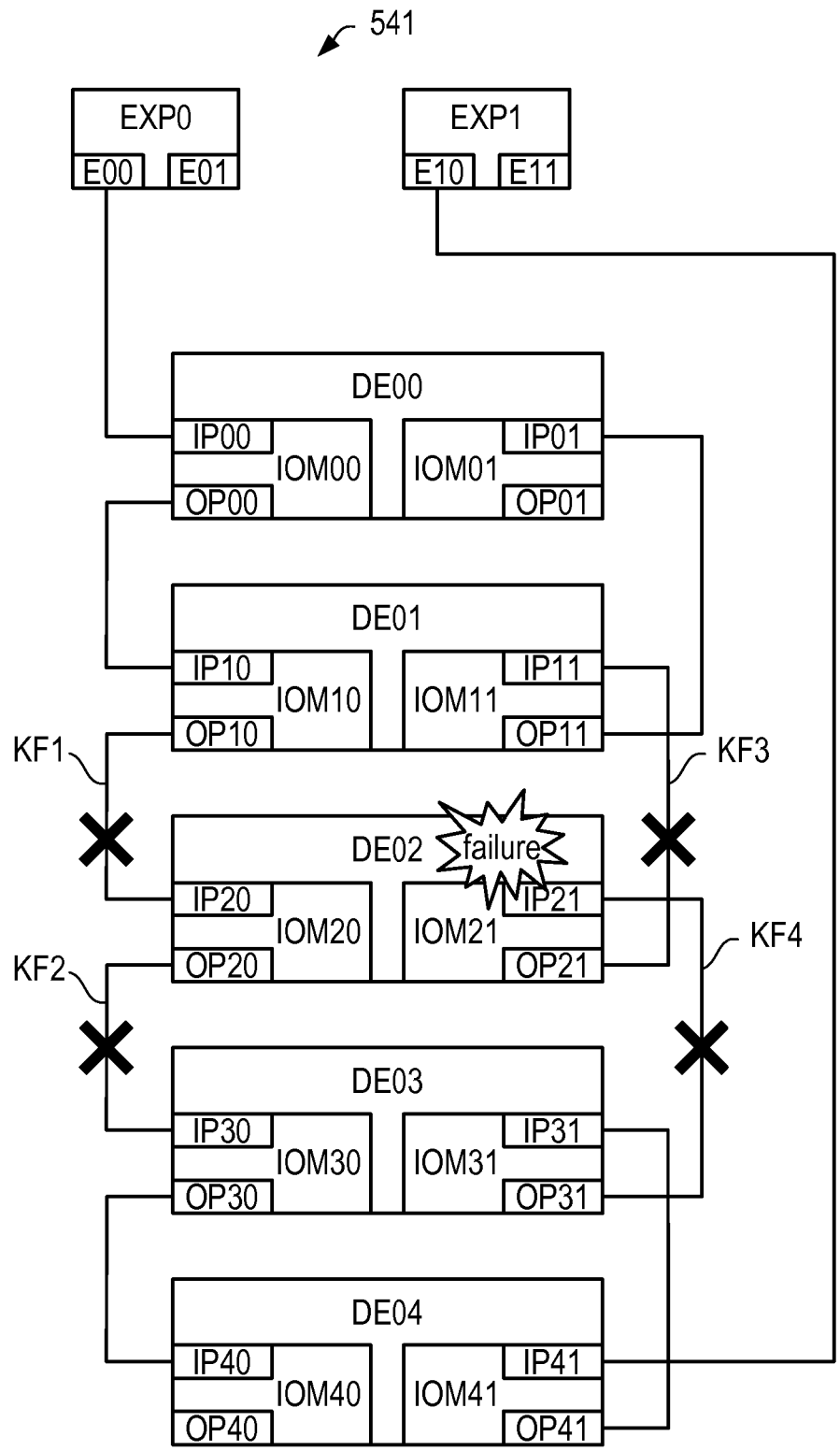
FIG. 34 is a diagram illustrating an example of a connection configuration of a RAID device according to a fourth embodiment.
Figure 35:
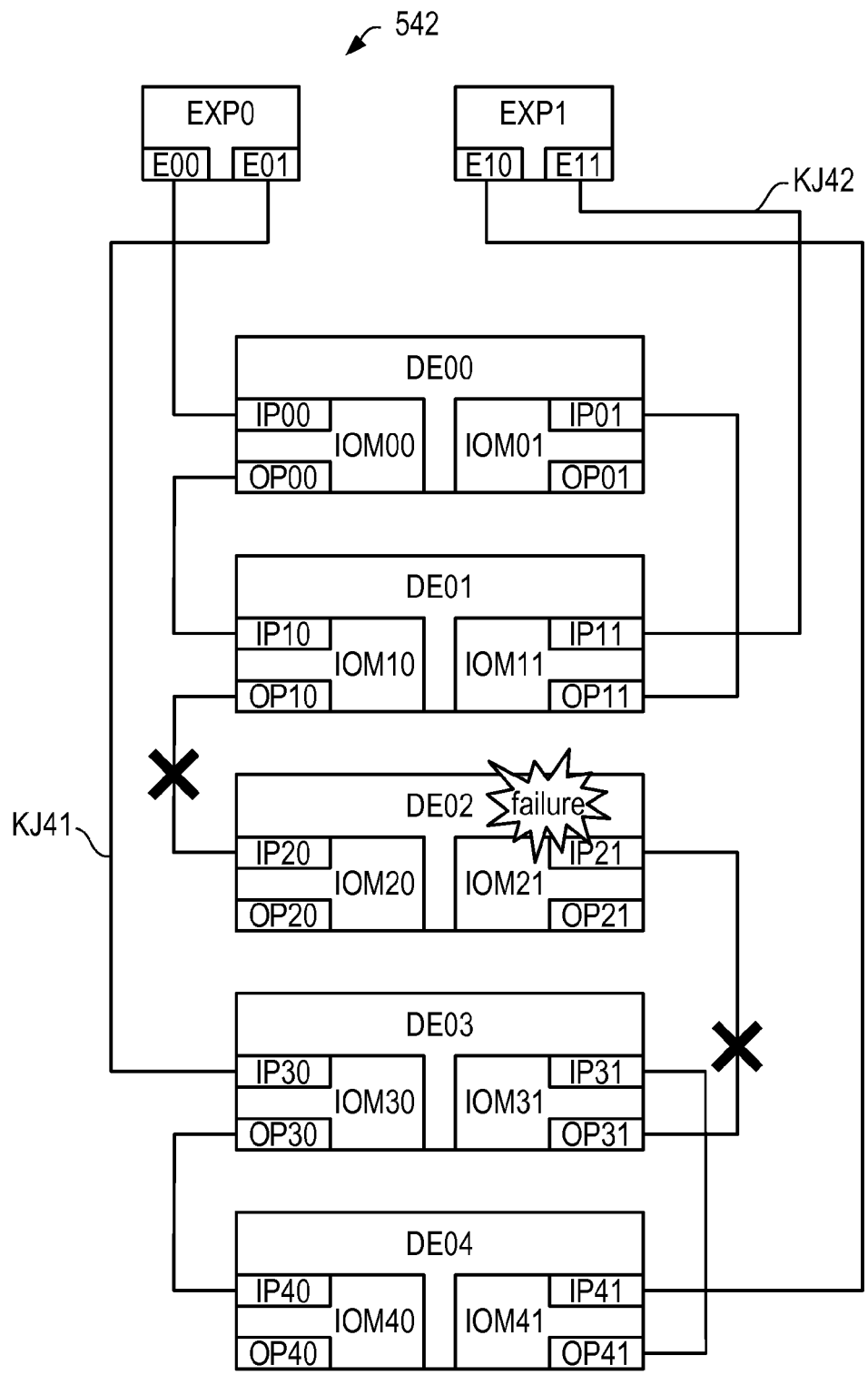
FIG. 35 is a diagram illustrating another example of the connection configuration of the RAID device according to the fourth embodiment.

Descriptions will be made on a connection of the redundant link in a case where the DE02 is in failure with reference to FIG. 34 and FIG. 35. First, descriptions will be made on the connection configuration in a case where the DE02 is in failure with reference to FIG. 34. FIG. 34 is a diagram illustrating an example of a connection configuration of a RAID device according to a fourth embodiment. The expander 23, the DE 20, the IOM 26, the Out port 25, the In port 27, and the Out port 28 are denoted using identification information instead of reference symbols in order to simplify the description. Further, the denoting by identification information as described above is similarly applied to FIG. 35.

The connection configuration 541 is the connection configuration in which accessing to the DE 20 by the link (KF1, KF2, KF3, and KF4) becomes disabled for a case where the DE02 is in failure. In the RAID device 13, when the DE02 is in failure, the DE00 and DE01 may be accessed only in the 0-system and thus the access redundancy is impaired. Further, in the RAID device 13, when the DE02 is in failure, the DE03 and DE04 may be accessed only in the 1-system and thus the access redundancy is impaired.

Next, descriptions will be made on a connection configuration according to the fourth embodiment with reference to FIG. 35. FIG. 35 is a diagram illustrating another example of the connection configuration of the RAID device according to the fourth embodiment. The connection configuration 542 illustrated in the diagram indicates a connection configuration in which the redundant links (KJ41 and KJ42) are connected when a work of replacing the DE02 which is in failure with a new DE 20 is performed.

The redundant link KJ41 connects one end thereof to the E01 which has been the empty port of the expander EXP0 of the 0-system and connects the other end thereof to the In port IP30 of the DE03. The RAID device 13 becomes able to access the DE03 and DE04 by the connection of the redundant link KJ41 in two systems composed of the 0-system and the 1-system such that the multiple accessing (redundancy) may be achieved.

The redundant link KJ42 connects one end thereof to the E11 which has been the empty port of the expander EXP1 of the 1-system and connects the other end thereof to the In port IP11 of the DE01. The RAID device 13 becomes able to access the DE00 and DE01 by the connection of the redundant link KJ42 in two systems composed of the 0-system and the 1-system such that the multiple accessing (redundancy) may be achieved.

In the present embodiment, in the RAID device 13, the redundant link is connected in the 0-system and the 1-system using the empty port of the expander 23. Accordingly, even when the DE 20 is in failure, the RAID device 13 may secure the redundancy in accessing to the DE 20. Further, in the RAID device 13, the information of the connection site of the redundant link may be set in advance, the connection site of the redundant link may be detected and determined by the discovery command, and the connection site of the redundant link may be set by other method.

Further, the RAID device 13 may perform a process of replacing the DE 02 by applying the method described in the second embodiment. With this configuration, the RAID device 13 switches the operation state to allow the connection of the redundant link in the process of adding the equipment. Accordingly, the RAID device 13 may reduce an operation time during which the access redundancy is impaired for the existing equipment in the addition process. Accordingly, the RAID device 13 may secure a work time while maintaining the redundancy in accessing to the existing equipment.

Further, the processing functions described above may be implemented by a computer. In this case, a program is provided in which the process contents of the functions to be equipped in the connection monitoring device 1 and the RAID device 13 are described. The program is executed by the computer such that the processing functions are implemented in the computer. The program having described therein the processing functions may be recorded in a computer-readable recording medium. The computer-readable recording medium may include, for example, a magnetic storage device, an optical disk, an opto-magnetic recording medium, and a semiconductor memory. The magnetic storage device may include, for example, a hard disk drive (HDD), a flexible disk (FD), and a magnetic tape. The optical disk may include, for example, a DVD, a DVD-RAM, and a CD-ROM/RW. The opto-magnetic recording medium may include, for example, an MO (Magneto-Optical disk).

A program may be distributed in a portable recording medium such as, for example, a DVD or a CD-ROM in which the program is recorded. Further, a program may be stored in a storage device of a server computer and transferred from the server computer to other computer via a network.

A computer which executes a program stores, for example, a program recorded in the portable recording medium or a program transferred from the server computer, in the storage device of its own. Also, the computer reads the program from the storage device of its own and executes a process according to the program. In the meantime, the computer may read the program directly from the portable recording medium and execute the process according to the program. Further, the computer may execute the process according to the program received sequentially each time when the program is transferred from the server computer connected via a network.

Further, at least some of processing functions described above may be implemented by an electronic circuit such as a DSP, an ASIC or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to an illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A connection monitoring device comprising:
    a first connection system in which a plurality of monitored devices are connected in cascade in a forward direction on which data is transmitted from the connection monitoring device to a first monitored device of the plurality of monitored devices;
    a second connection system in which the plurality of monitored devices are connected in cascade in a backward direction on which data is transmitted from the connection monitoring device to a last monitored device of the plurality of monitored devices;
    a memory configured to store configuration information on connection configuration of the plurality of monitored devices and connection permitting information including information on a path permitted between the connection monitoring device and the plurality of monitored devices within paths undefined in the configuration information; and
    a controller including a processor coupled to the memory and configured to change a monitoring state from a first monitoring state in which the connection configuration of the plurality of monitored devices is monitored in accordance with the configuration information to a second monitoring state in which the connection configuration of the plurality of monitored devices is monitored in accordance with the configuration information and the connection permitting information in a case where a configuration modification, accompanied with cutting of any one of connections of the first connection system and the second connection system, of the plurality of monitored devices is performed.

2. The connection monitoring device according to claim 1, wherein the connection permitting information includes information which permits a connection of a third connection system in which the plurality of monitored devices are connected with the connection monitoring device, instead of any one of connections of the first connection system and the second connection system for which the connection is cut.

3. The connection monitoring device according to claim 1, wherein the processor of the controller is configured to notify of a work procedure based on the configuration information in the first monitoring state and to notify of a work procedure based on the configuration information and the connection permitting information in the second monitoring state.

4. The connection monitoring device according to claim 1, wherein the processor of the controller is configured to monitor the connection configuration of the plurality of monitored devices by using the configuration information and configuration detection information generated by detecting the connection configuration of the plurality of monitored devices in the first monitoring state, and to monitor the connection configuration of the plurality of monitored devices by using the configuration information, the connection permitting information, and the configuration detection information in the second monitoring state.

5. The connection monitoring device according to claim 4, wherein the processor of the controller is configured to detect the connection configuration of the plurality of monitored devices and to generate the configuration detection information when a modification is made in the detected connection configuration.

6. The connection monitoring device according to claim 1,
wherein the configuration modification is to add the monitored device to a terminating device of any one of the first connection system and the second connection system, and
wherein the terminating devices of the first connection system and the second connection system are the last monitored device and the first monitored device, respectively.

7. The connection monitoring device according to claim 1, wherein the configuration modification is to replace the monitored device connected to any one of the first connection system and the second connection system.

8. The connection monitoring device according to claim 1, wherein the connection permitting information permits a connection of a third connection system which allows multiple accessing paths between the plurality of monitored devices and the connection monitoring device instead of a connection of any one of the first connection system and the second connection system for which a connection is cut.

9. A non-transitory computer-readable recording medium storing a program that causes a computer to execute a procedure of a connection monitoring device having a first connection system in which a plurality of monitored devices are connected in cascade in a forward direction on which data is transmitted from the connection monitoring device to a first monitored device of the plurality of monitored devices and a second connection system in which the plurality of monitored devices are connected in cascade in a backward direction on which data is transmitted from the connection monitoring device to a last monitored device of the plurality of monitored devices, the procedure comprising:
storing configuration information on a connection configuration of the plurality of monitored devices and connection permitting information including information on a path permitted between the connection monitoring device and the plurality of monitored devices within paths undefined in the configuration information; and
changing a monitoring state from a first monitoring state in which the connection configuration of the plurality of monitored devices is monitored in accordance with the configuration information to a second monitoring state in which the connection configuration of the plurality of monitored devices is monitored in accordance with the configuration information and the connection permitting information in a case where a configuration modification, accompanied with cutting of any one of connections of the first connection system and the second connection system, of the plurality of monitored devices is performed.

10. A connection monitoring method of a connection monitoring device having a first connection system in which a plurality of monitored devices are connected in cascade in a forward direction on which data is transmitted from the connection monitoring device to a first monitored device of the plurality of monitored devices and a second connection system in which the plurality of monitored devices are connected in cascade in a backward direction on which data is transmitted from the connection monitoring device to a last monitored device of the plurality of monitored devices, the connection monitoring method comprising:
storing configuration information on a connection configuration of the plurality of monitored devices and connection permitting information including information on a path permitted between the connection monitoring device and the plurality of monitored devices within paths undefined in the configuration information; and
changing a monitoring state from a first monitoring state in which the connection configuration of the plurality of monitored devices is monitored in accordance with the configuration information to a second monitoring state in which the connection configuration of the plurality of monitored devices is monitored in accordance with the configuration information and the connection permitting information in a case where a configuration modification, accompanied with cutting of any one of connections of the first connection system and the second connection system, of the plurality of monitored devices is performed.

* * * * *